United States Patent
Griffin et al.

(10) Patent No.: US 7,987,128 B2
(45) Date of Patent: Jul. 26, 2011

(54) COMPUTER IMPLEMENTED AND/OR ASSISTED METHODS AND SYSTEMS FOR DETECTING, TRACKING AND RESPONDING TO TOXIC, OR LIKELY TOXIC, ORDERS IN AN EQUITIES ORDER FLOW USING TOXICITY AND/OR PROFIT ANALYZERS

(75) Inventors: Kenneth C. Griffin, Chicago, IL (US); Matthew Andresen, Chicago, IL (US)

(73) Assignee: Citadel Investment Group, L.L.C., Chicago, IL (US)

( * ) Notice: Subject to any disclaimer, the term of this patent is extended or adjusted under 35 U.S.C. 154(b) by 144 days.

(21) Appl. No.: 12/546,854

(22) Filed: Aug. 25, 2009

(65) Prior Publication Data
US 2009/0313179 A1 Dec. 17, 2009

Related U.S. Application Data

(62) Division of application No. 10/999,571, filed on Nov. 30, 2004, now Pat. No. 7,587,347.

(60) Provisional application No. 60/619,997, filed on Oct. 19, 2004.

(51) Int. Cl.
*G06Q 40/00* (2006.01)
(52) U.S. Cl. .................. 705/35; 705/37; 705/1; 705/36
(58) Field of Classification Search ................ 705/1, 35, 705/36 R, 37, 26, 80, 45; 370/252, 337; 707/1–10
See application file for complete search history.

(56) References Cited

U.S. PATENT DOCUMENTS

| | | | |
|---|---|---|---|
| 5,835,896 A | 11/1998 | Fisher et al. | |
| 5,873,071 A * | 2/1999 | Ferstenberg et al. | 705/36 R |
| 5,905,974 A | 5/1999 | Fraser et al. | |
| 5,905,975 A | 5/1999 | Ausubel | |
| 5,940,809 A | 8/1999 | Musmanno et al. | |
| 6,016,483 A | 1/2000 | Rickard et al. | |
| 6,021,398 A | 2/2000 | Ausubel | |
| 6,112,189 A | 8/2000 | Rickard et al. | |
| 6,173,270 B1 | 1/2001 | Cristofich et al. | |

(Continued)

FOREIGN PATENT DOCUMENTS

WO  WO-02/09008 A1  1/2002

(Continued)

OTHER PUBLICATIONS

"Standard & Poor's New Risk Evaluation Tool Now Available to All Desktop Underwriter Lenders"—Business Publications—Business Editors—Business Wire—New York, N.Y.—May 6, 1998.*

(Continued)

*Primary Examiner* — Mary Cheung
*Assistant Examiner* — John H Holly
(74) *Attorney, Agent, or Firm* — Wilmer Cutler Pickering Hale and Dorr LLP

(57) ABSTRACT

Methods and systems are provided which enable equities broker-dealers to execute an equity trade order while simultaneously eliminating (or at least reducing) exposure to the negative consequences associated with toxic (or likely toxic) orders in the equities market. By using toxicity and/or profit analyzers, for example, to detect, track and respond to the level of toxic (or likely toxic) orders present in an equities order flow, a broker dealer can reduce the level of risk inherent in serving as counter-party to order flows, such as anonymous equities order flows. Various alternative embodiments are also disclosed.

6 Claims, 23 Drawing Sheets

U.S. PATENT DOCUMENTS

| | | | |
|---|---|---|---|
| 6,243,691 | B1 | 6/2001 | Fisher et al. |
| 6,377,940 | B2 | 4/2002 | Tilfors et al. |
| 6,618,707 | B1 | 9/2003 | Gary |
| 2001/0044767 | A1 | 11/2001 | Madoff et al. |
| 2002/0019795 | A1 | 2/2002 | Madoff et al. |
| 2002/0035534 | A1 | 3/2002 | Buist et al. |
| 2002/0055901 | A1* | 5/2002 | Gianakouros et al. .......... 705/37 |
| 2002/0087456 | A1 | 7/2002 | Abeshouse et al. |
| 2002/0091606 | A1 | 7/2002 | Shapiro |
| 2002/0095369 | A1 | 7/2002 | Kaplan et al. |
| 2002/0128958 | A1 | 9/2002 | Slone |
| 2002/0156716 | A1 | 10/2002 | Adatia |
| 2002/0161687 | A1 | 10/2002 | Serkin et al. |
| 2002/0194105 | A1 | 12/2002 | Klein |
| 2003/0004858 | A1 | 1/2003 | Schmitz et al. |
| 2003/0014354 | A1 | 1/2003 | Madoff et al. |
| 2003/0061148 | A1 | 3/2003 | Alavian |
| 2003/0088501 | A1 | 5/2003 | Gilbert et al. |
| 2003/0177082 | A1 | 9/2003 | Buckwalter |
| 2003/0177085 | A1 | 9/2003 | Buckwalter et al. |
| 2004/0002913 | A1 | 1/2004 | Breen et al. |
| 2004/0024689 | A1 | 2/2004 | Zhou et al. |
| 2004/0030630 | A1 | 2/2004 | Tilfors et al. |
| 2005/0021445 | A1 | 1/2005 | Caro |

FOREIGN PATENT DOCUMENTS

| | | | |
|---|---|---|---|
| WO | WO-2004/042514 | A2 | 5/2004 |

OTHER PUBLICATIONS

Battalio et al., "Toward a National Market System for U.S. Exchange-listed Equity Options" The Journal of Finance, vol. 59, No. 2, pp. 933-962 (2004).

"Competitive Developments in the Options Market; Proposed Rule." Federal Register, vol. 69, No. 26. (Feb. 9, 2004).

Feb. 16, 2007. International Search Report and Written Opinion for PCT Application No. PCT/US2005/036608.

Forsyth "The Electronic Investor: What Need for Speed? As Online Brokers Tout Fast Executions, SEC Data Show Most Trades Take Only Two Seconds". Barrons(Jul. 5, 2004).

Glosten et al., "Bid, Ask and Transaction Prices in a Specialist Market with Heterogeneously Informed Traders" Journal of Financial Economics, vol. 14, pp. 71-100 (1985).

Nov. 13, 2006. International Search Report and Written Opinion for PCT Application No. PCT/US2005/034538.

Nov. 8, 2006. PCT International Search Report and Written Opinion for PCT Application No. PCT/US2005/035792.

"Payment for Order Flow and Internalization in the Options Market." SEC Special Study, Office of Compliance and Examination/Office of Economic Analysis. (Dec. 2000).

"Self-Regulatory Organizations; Notice of Filing of Proposed Rule Change and Amendment No. 1 Thereto by the International Securities Exchange, Inc. to Establish Rules Implementing a Price Improvement Mechanism." Federal Register, vol. 69, No. 42. (Mar. 3, 2004).

Simon, "Brokerags Battle for Active Traders—Fidelity, Schwab, Others Cut Commissions for Best Customers; The One-Second Execution" The Wall Street Jounal, (Jun. 22, 2004).

Tunick, "Playing the Wires: ATD's Trading Technology is Ahead of the Curve, But Can It reel in Retail Brokerages". Investment Dealers Digest, (Nov. 10, 2003).

U.S. Securities and Exchange Commission "Special Study: Payment for Order Flow and Internalization in the Options Markets" pp. 1-48 (Dec. 2000).

* cited by examiner

COMPUTER IMPLEMENTED AND/OR ASSISTED METHODS AND SYSTEMS FOR DETECTING, TRACKING AND RESPONDING TO TOXIC, OR LIKELY TOXIC, ORDERS IN AN EQUITIES ORDER FLOW USING TOXICITY AND/OR PROFIT ANALYZERS

CROSS-REFERENCE TO RELATED APPLICATION

This application is a Divisional application of U.S. application Ser. No. 10/999,571, filed on Nov. 30, 2004, now U.S. Pat. No. 7,587,347, which claims priority to U.S. Provisional Patent Application No. 60/619,997, filed Oct. 19, 2004, which is hereby incorporated by reference herein in its entirety.

FIELD OF THE INVENTION

The present invention relates to computer implemented and/or assisted methods and systems for the trading of securities, such as equities. More particularly, this invention relates to computer implemented methods and systems that use toxicity and/or profit analyzers for detecting, tracking and/or responding to purchase and/or sell orders of a variety of securities, such as equities, that are likely to be, or are in fact, "toxic."

BACKGROUND OF THE INVENTION

There are several important players in the U.S. securities market, including investors, full-service broker-dealers, retail broker-dealers that do not execute their own orders but rather route their order flow to other broker-dealers for execution (also referred to herein as order flow providers, or OFPs), broker-dealers that consolidate order flow from multiple OFPs (also referred to herein as wholesalers, or consolidating broker-dealers), and market-makers. It will be understood that, as used herein, the term "broker-dealer" refers to any entity that, when acting as a broker, executes orders on behalf of his client, and that executes trades for his firm's own account when acting as a dealer.

Generally speaking, investors drive the market by entering orders to buy or sell one or more securities. An investor may be, for example, an individual or an institution, such as a mutual fund or a corporation. The OFPs in the market aggregate investor buy/sell orders, and deliver these orders to one or more consolidating broker-dealers (acting as wholesalers) or to market making firms.

In order to provide liquidity in the market, one or more dealers agree to maintain firm bid and ask prices in one or more specific securities. These dealers, which are commonly referred to as "market-makers," display bid and offer prices for these specific securities, and if these prices are met, will immediately buy for or sell from their own accounts. For example, almost every market (e.g., exchange, whether physical or virtual) where securities are traded has some form of market-maker that enters continuous two-sided quotations.

It is common for one or more market-makers on a given market to be provided significant responsibilities, including overseeing the opening, providing continuous quotations in all of their assigned securities, and handling customer orders that are not automatically executed in connection with that exchange. In the case of the U.S. equities and options exchanges, these market-makers, which are responsible for maintaining fair and orderly markets, are generally termed "specialists." Depending on the particular exchange, the "specialist" may be referred to as, for example, a designated primary market-maker (DPM), lead market-maker (LMM), or primary market-maker (PMM), etc. Other market-makers in the crowd on an exchange floor, if any, are referred to as "floor market-makers." For U.S. listed equities (e.g., stocks listed on the American Stock Exchange (AMEX) or the New York Stock Exchange (NYSE)), there are also firms that make markets off the exchange floor, and these firms are known as "over-the-counter" (OTC) market-makers or third market-makers.

Over the last half-century, the U.S. equities market has evolved into the widely accessible, efficient market we know today. This transformation has been driven, in part, by the demands of both retail and institutional investors for high quality and efficient trade execution.

Moreover, pricing efficiency in the U.S. equities market has benefited from various regulations that have been set forth by the Securities and Exchange Commission (SEC), the various securities exchanges, and the National Association of Securities Dealers (NASD), which is a self-regulatory organization (SRO) responsible for the operation and regulation of NASDAQ and over-the-counter markets. For example, a broker-dealer or market-maker must seek to obtain "best execution" (with order pricing being a significant factor) when handling a customer's equities order. In addition, there is a prohibition (subject to exceptions) in the listed equities markets against the practice of "trading-through," in which a customer's order for an exchange listed equity is executed at a price inferior to the best available bid or offer. This trade-through prohibition does not apply, however, to NASDAQ listed equities. Moreover, under the SEC's "firm quote" rule, which is also subject to exceptions, a broker-dealer or market-maker is required to execute any equities order presented to it to buy or sell a security at a price at least as favorable to the buyer or seller as its published bid or offer, up to its published quotation size. These and other requirements help to ensure a relatively transparent equities market.

Existing SEC rules require all equity market centers (e.g., exchanges and broker-dealers acting as market-makers) to report data regarding the execution quality (e.g., speed, effective spread, trade-throughs) of their trades. These rules allow investors and broker-dealers to identify and avoid those market centers with a record of poor execution quality, in favor of those with better execution quality histories. In some circumstances, the broker-dealer community as a whole may seek to reduce (or completely eliminate) its exposure to a particular exchange, trading system, or market-maker in response to consistent execution of low quality (e.g., slow or mis-priced) trades by that market center. In such cases, even at times when that market center has a quote representing the "national-best-bid-or-offer" (NBBO), the other broker-dealers in the community may choose to internalize their trades (see below), if possible, or to route their orders to another venue.

FIG. 1 is a simplified illustration of one example of an order flow in the U.S. equities market. In general, as shown, investor 110 submits an order to buy or sell an equity (or equities) to OFP 120, which submits that order to wholesaler, or consolidating broker-dealer 130. In turn, consolidating broker-dealer 130 either internalizes the order (as explained below) or takes the order to an appropriate exchange of equities market 140 for execution. Equities market 140 shown in FIG. 1 may include, for example, the AMEX, the NYSE, NASDAQ (formerly referred to as the National Association of Securities Dealers Automated Quotation system), one or more electronic communications networks (ECNs), and one or more third market-makers. In equities market 140, publicly traded equities listed on one exchange can be traded, for example, on one or more regional stock exchanges (not shown), certain ECNs, and NASDAQ's SuperMontage system. It should also be noted that, with regard to NASDAQ (which is a competing dealer system and is currently not considered an "exchange"), consolidating broker-dealers can route orders in NASDAQ securities to NASDAQ's SuperMontage system, the NASD's Alternative Display Facility, ECNs, or specific NASDAQ market making firms.

In terms of fees associated with the order flow shown in FIG. 1, investor 110 pays OFP 120 a commission for executing his trade, while consolidating broker-dealer 130 pays OFP 120 for providing a given volume of order flow. The profit for consolidating broker-dealer 130, when internalizing the trade (as explained below), is made at the level of the trade execution, and is based on the spread between bid and offer prices for the equity (or equities) being bought or sold by investor 110. If consolidating broker-dealer 130 routes the order (e.g., to an exchange) for execution by another entity, however, consolidating broker-dealer 130 may receive some form of payment for the order flow (e.g., depending on the exchange that the order was routed to). When consolidating broker-dealer 130 is a full-service broker-dealer, for example, orders from investor 110 may be sent directly to consolidating broker-dealer 130 (which may then internalize the order or take the order to an appropriate exchange of equities market 140 for execution).

The concept of "trade execution quality" has emerged as a benchmark for investors to compare and contrast brokerage service providers along several dimensions, such as transaction costs, quote certainty, execution speed, price improvement, and market liquidity. In general, the growth of the investor community has placed continual pressure on service providers to improve execution quality along each of these dimensions.

The speed with which investor orders are filled in the U.S. equities market has benefited from the fact that broker-dealers who are OTC market-makers in listed equities and/or NASDAQ market-makers have the ability to "internalize" trades, in which they fill an order received from an OFP out of their own inventory in that equity. FIG. 2 is a simplified illustration of one example of an order flow in the U.S. equities market in which an order placed by investor 110 is internalized by consolidating broker-dealer 130. The ability of consolidating broker-dealer 130 to internalize a trade in the equities market affords it an opportunity to offer investors (such as investor 110) improved order execution speed. In addition, internalized orders have been known to receive some level of price improvement over the NBBO, with broker-dealers sometimes offering better fill prices to OFPs in exchange for a guaranteed level of trading volume.

Overall, the competitive landscape in the equities markets, along with the rapid expansion of internalization, have combined to provide investors with better execution quality along the price improvement and execution speed dimensions. For example, the equities market has progressed extremely rapidly over the last several years from ten-second trade execution guarantees to more recent guarantees of one-second executions, and at increasingly narrow bid/offer spreads.

With the improvements in execution quality offered by consolidating broker-dealers in the equities market, however, has come increased risk to those same broker-dealers of exploitation by professional traders. These professional traders often possess (and seek to profit from) knowledge not available to the general investing public about the true underlying value of an equity, as well as where the price of the equity will (or is likely to) move in the near future. This is in contrast to standard traders, who are more likely to trade based on pure speculation, publicly available information, and/or liquidity or hedging needs, for example, and are less likely to have the information necessary to capitalize on "toxic" orders (which generally refers to orders that, if accepted by a consolidating broker-dealer, would result in no profit, reduced profit and/or a loss to the broker-dealer and/or an affiliate of the broker-dealer). Stated another way, an equity order is said to be toxic from the standpoint of a consolidating broker-dealer when it is asked to supply market liquidity (i.e., to buy or sell) in situations where it makes no profit, reduced profit and/or indeed takes a loss on the trade.

As an example, consider a situation where equity XYZ has a bid price of 20 and an offer price of 20.25. If a professional trader has knowledge (e.g., insider information) suggesting that the theoretical fair value (e.g., the value to which the price is likely to move in the near future) of XYZ is 19, generally speaking, he will sell at the price of 20, and will not buy at the price of 20.25. Conversely, if the same professional trader has reason to believe that the theoretical fair value of XYZ is 21, generally speaking, he will buy at the price 20.25, but will not be willing to sell at the price of 20. A standard trader, by contrast, will generally not have this type of knowledge regarding present or future movements in price, and thus, will more likely trade based on pure speculation, publicly available information, and/or liquidity or hedging needs, for example.

As a consolidating broker-dealer is generally more likely to receive toxic orders from professional traders than from standard traders, the broker-dealer will generally be able to earn higher profits (or at worst break-even) over time by trading with standard traders. In light of this, a consolidating broker-dealer would be willing to pay for the privilege of trading with standard traders, if it were feasible to identify them. It would therefore be desirable to provide a method and system which would allow a market participant to detect and track the level of orders in a given equities order flow that are likely to be toxic, or in fact are, "toxic" versus the orders that are likely to be, or in fact are, "non-toxic." Moreover, an ideal system would allow the market participant to respond to the nature of that order flow by, for example, rewarding a trading party (e.g., an OFP or an investor) for providing a less "toxic" equities order flow.

SUMMARY OF THE INVENTION

Computer-implemented and/or assisted methods and systems are provided that use toxicity and/or profit analyzers for detecting, tracking and/or responding to purchase and/or sell orders of a variety of securities, such as listed equities or equities traded only in the over-the-counter markets, that are likely to be, or are in fact, "toxic." By providing means, devices and/or processes to detect, track and respond to the level of toxic (or likely toxic) orders present in an equities order flow using, for example, in at least one embodiment of the invention, order toxicity characteristics and/or profit analyzers, these methods and systems allow for better execution quality for investors, while eliminating (or at least reducing) the level of broker-dealer risk inherent in serving as a counter-party in equities transactions, such as anonymous equities transactions.

In one embodiment of the invention, a method of executing an equity order includes the sequential, sequence independent and/or non-sequential steps of receiving the order by a broker-dealer including order characteristics, determining at least one toxicity quotient responsive to the order characteristics, and analyzing the order to determine eligibility for execution using the at least one toxicity quotient. If it is determined that the order is eligible for execution, the method includes initiating execution of the order responsive to the eligibility for execution as determined by the analyzing the order using the at least one toxicity quotient.

In another embodiment of the invention, a method of executing an equity order includes the sequential, sequence independent and/or non-sequential steps of receiving the order by a broker-dealer, initiating execution of the order by the broker-dealer, and monitoring the outcome of the trade when the order is executed. If it is determined that the completed trade is toxic, the method includes implementing a corrective action based at least in part on the step of monitoring the outcome of the trade.

A method of executing an equity order includes the sequential, sequence independent and/or non-sequential steps of receiving the order by a broker-dealer and determining compliance of the order with a rule-set. The rule-set is based at least in part on the measuring of at least one of order, market condition, and execution parameters of at least one order to be executed and correlating the measured parameters with the outcome of the trade. If it is determined that the order complies with the rule-set, the method includes initiating execution of the order by the broker-dealer.

In alternative embodiments, the invention includes a computer system and/or tangible medium for implementing the method.

In alternative embodiments, the method measures at least one of order, market condition, and execution parameters of at least one order to be executed, and correlates the measured parameters with the outcome of trade to determine the at least one toxicity quotient.

In alternative embodiments, the method reviews one or more parameters of the order relating to at least one of size of the order, frequency of order submission, identity of the equity, market source of national-best-bid-or-offer (NBBO), order size relative to NBBO size, liquidity of the equity, current NBBO bid-offer spread, and the equity-market performance correlation of the equity.

In alternative embodiments, the method determines at least one toxicity quotient responsive to the order characteristics and generates the at least one toxicity quotient by the broker-dealer.

In alternative embodiments, the method receives the at least one toxicity quotient by the broker-dealer.

In alternative embodiments, the method either rejects the order or executes a modified version of the order based on execution eligibility.

In alternative embodiments, the method uses a modified version of the order that includes a modified order size.

In alternative embodiments, the toxicity quotient is modified following its generation.

In alternative embodiments, the method receives the order from an order flow provider, and sends the order from the order flow provider to the broker-dealer.

In alternative embodiments, the method sends a toxicity report to the order flow provider based at least in part on the execution eligibility determination.

In alternative embodiments, the method places the order by an investor. In alternative embodiments, the method places the order by an order flow provider.

In alternative embodiments, the method monitors the outcome of the trade when the order is executed.

In alternative embodiments, the method logs the bid/offer spread at the time the order is filled.

In alternative embodiments, the method implements corrective action based at least in part on the step of monitoring the outcome of the trade.

In alternative embodiments, the method takes corrective action, where the corrective action includes modifying payment for the order received by the broker-dealer. In alternative embodiments, the corrective action includes modifying payment for future order flow received by the broker-dealer. In alternative embodiments, the correction action includes increasing the fee for the investor that placed the order received by the broker-dealer. In alternative embodiments, the corrective action includes increasing the fee for future orders submitted by the investor that placed the order received by the broker-dealer.

In alternative embodiments, the method determines conformance of the order with a rule-set that includes at least one rule used to implement the order execution.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

Additional embodiments of the invention, its nature and various advantages, will be more apparent upon consideration of the following detailed description, taken in conjunction with the accompanying drawings, in which like reference characters refer to like parts throughout, and in which.

DETAILED DESCRIPTION OF THE INVENTION

Figure 1:
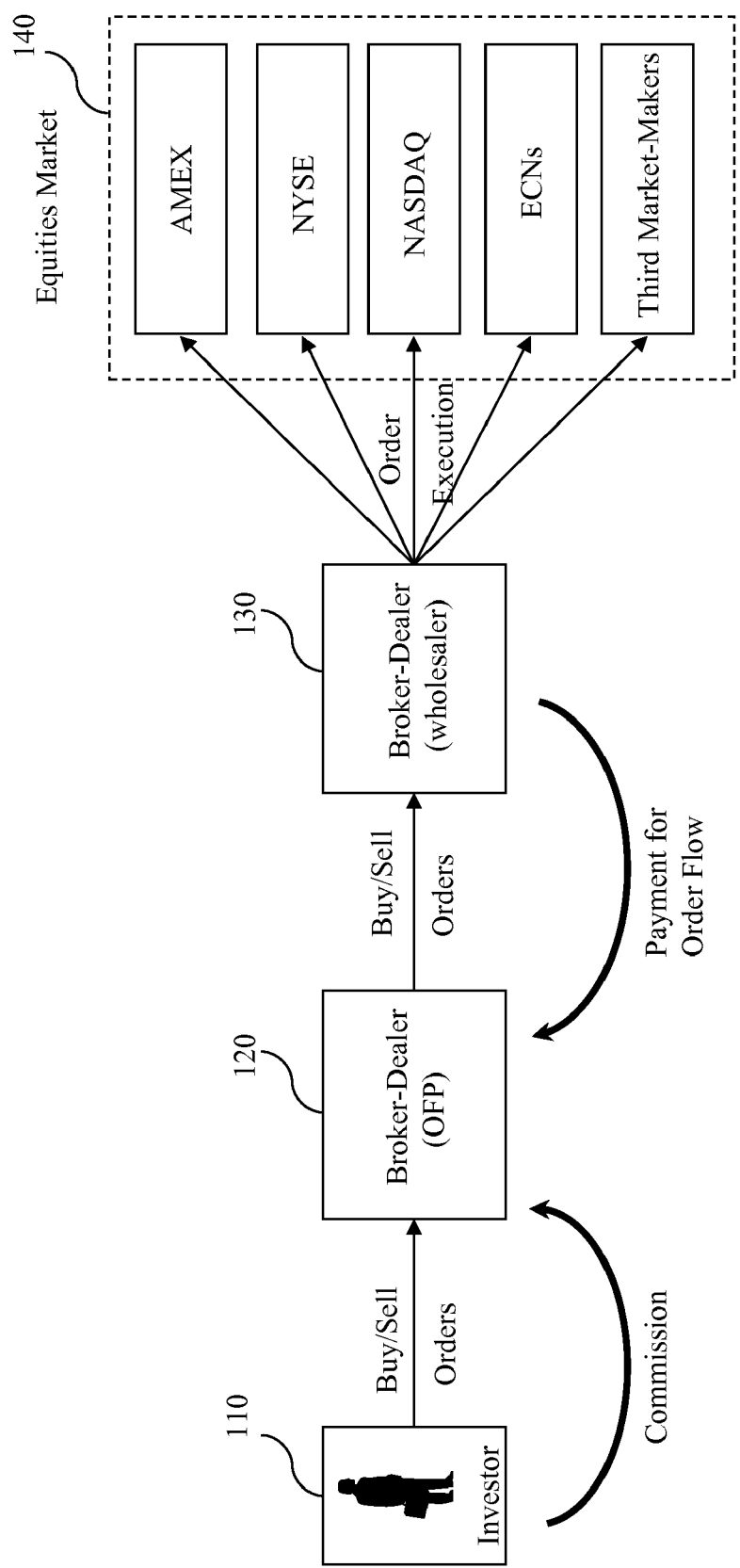
FIG. 1 is a simplified illustration of one example of an order flow in the U.S. equities market.
Figure 2:
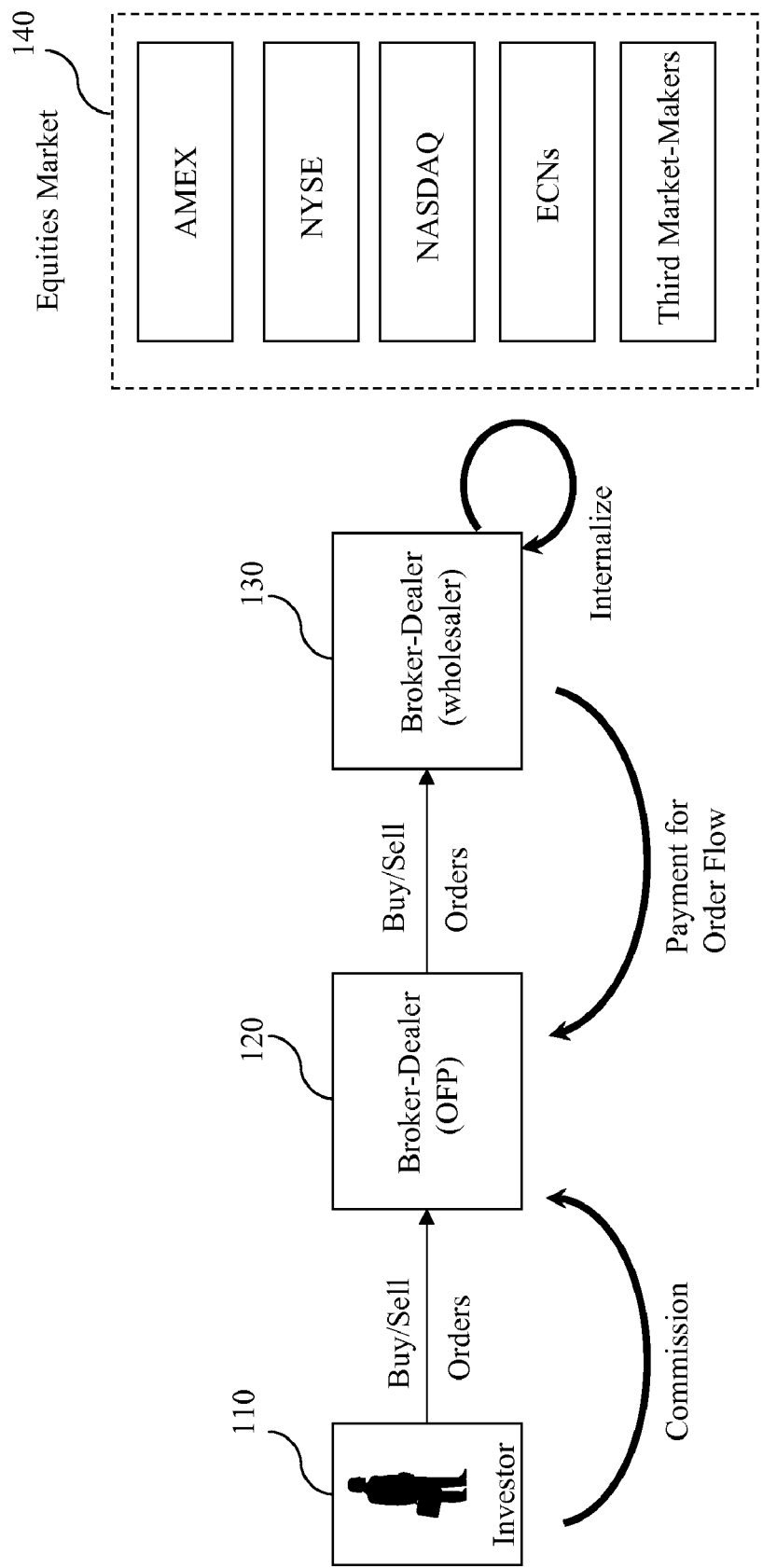
FIG. 2 is a simplified illustration of another example of an order flow in the U.S. equities market, in which an order placed by an investor is internalized by a broker-dealer.

The following description includes many specific details. The inclusion of such details is for the purpose of illustration only and should not be understood to limit the invention. Moreover, certain features, which are well known in the art, are not described in detail in order to avoid complication of the subject matter of the present invention. In addition, it will be understood that features in one embodiment may be combined with features in other embodiments of the invention.

Computer implemented and/or assisted methods and systems are described for the detection, tracking and response to orders in an equities order flow that are likely to be, or are in fact, "toxic" using, for example, toxicity and/or profit analyzers. In at least one embodiment of the invention, order toxicity characteristics and/or profit analyzers are used to quantify and/or mitigate the risk inherent in serving as a counter-party to equities transactions, such as anonymous equities transactions and other transactions.

In many instances, a consolidating broker-dealer does not know the identity of the investor who submitted the order to which it will serve as counter-party. Thus, a consolidating broker-dealer that accepts equity orders (e.g., internalizes, executes and/or otherwise commits to the execution of the orders) from an OFP may be exposed to significant financial risk due to, in at least one embodiment, the anonymous nature of orders within that order flow. For example, as explained above, professional traders may seek to take advantage of the consolidating broker dealer by trading on information affecting future price movements which is not available to the general investing public (or to the broker-dealer). In such instances, these professional traders may send toxic (or likely toxic) orders to a potentially naïve broker-dealer that may consequently acquire net trading losses from serving as a counter-party for these orders.

Therefore, according to the present invention, toxicity and profitability measurement methods and systems are provided which may be used, for example, to detect, track and/or respond to the level of toxic (or likely toxic) orders present in an equities order flow. The concept of toxicity and the use of toxicity measurement methods and systems according to the invention are described in greater detail immediately below, followed by a detailed description of the use of profitability measurement methods and systems.

As explained above, when not receiving orders directly from investor 110 (e.g., in the case of a full-service broker-dealer), consolidating broker-dealer 130 pays OFP 120 for providing a given volume of order flow. Moreover, when consolidating broker-dealer 130 takes an incoming order from OFP 120 and routes it to an exchange, it generally receives some form of payment from the exchange. On the other hand, the profit for consolidating broker-dealer 130 may be at least partially based on the spread between bid and offer prices for the equity, for example, if the consolidating broker-dealer internalizes the order.

In instances where a consolidating broker-dealer 130 accepts a toxic order, regardless of what entity ultimately fills the order, the profitability of consolidating broker-dealer 130 is likely to suffer as a result of accepting the toxic order. For example, when an affiliated market-maker or market-making firm of consolidating broker-dealer 130 takes a loss on a toxic trade, it is likely that this affiliated market-maker or market-making firm will seek compensation in one form or another from consolidating broker-dealer 130.

It should be noted that, with a standard investing population, a certain level of toxic trades and/or trades that are suspect to be toxic may be tolerated and/or is to be expected due to the random arrival of orders in conjunction with the random movement of equity bid and offer levels. With the professional investing population (e.g., professional traders), however, the level of toxic trades is likely to be increased as professional investors make trading decisions based upon, for example, non-publicly available information or other information not readily available to the standard trader regarding the future movement of equities prices. Accordingly, it is particularly important to be able to limit the financial risk associated with serving as a trading counter-party to an equities order flow, such as an anonymous equities order flow.

While profit for consolidating broker-dealer 130 is determined generally via a post-execution measure (as explained below), we have determined that toxic orders are likely to have a set of common and/or predetermined characteristics at the order, market, and execution parameter levels which may provide either or both of consolidating broker-dealer 130 and OFP 120 with some level of predictive ability, thus enabling corrective action before an order is executed. Similarly, these common and/or predetermined characteristics may be used when deciding whether to take post order execution corrective action, for example, based on forensic characteristics associated with toxic orders. This has the potential, in turn, to improve the profitability of consolidating broker-dealer 130, which may also translate into higher profitability (e.g., higher per order payment) for OFP 120 for real-time order execution and/or subsequent order execution.

The invention recognizes that predetermined and/or specific orders (and ensuing associated trades) have a set of distinct characteristics that can be used to characterize their level of toxicity and thus provide broker-dealer 130 (or OFP 120) with some level of predictive capability, as described above. The variables which can be used to characterize toxicity can be derived from order parameters, market condition parameters, and/or order execution parameters. For example, the following order parameters can be used: the identity of the equity (e.g., symbol), the action type (e.g., buy or sell), the order type (e.g., market, limit, stop, all-or-none), the limit price (e.g., for a limit order), and the order size (e.g., the number of shares). In addition, the following market condition parameters can be considered with respect to the ordered equity: the theoretical value of the equity, the frequency of order submission, the NBBO market source, the NBBO size, the liquidity of the equity in the market, the implied spread (NBBO), and equity-market performance correlation (e.g., beta). Moreover, the following execution parameters can be considered: the fill spread (e.g., the bid/offer spread at the time of filling the order) and the fill price. The invention is not limited by the particular characteristics that are examined in this regard, and any other distinct characteristic may be used alone and/or in combination with any or all of the above mentioned parameters in accordance with the principles of the present invention.

According to at least one embodiment of the invention, some or all of the above and other order, market condition, and/or order execution parameters may be combined empirically to generate a "toxicity quotient" for orders placed by investor 110. For example, consolidating broker-dealer 130 (or another participant in the equities order flow) may generate toxicity quotients by measuring order, market condition, and/or execution parameters of various orders over time, and correlating these parameters with the outcome of trades (e.g., toxic trades yielding a loss compared to normal profitable trades). Moreover, various order characteristics of a received (but not yet executed) order may optionally be compared to previously received (and potentially executed) orders in order to determine such a toxicity quotient. It should be noted that, while consolidating broker-dealer 130 may be the generator of a toxicity quotient, the invention is not limited in this manner. In particular, it is contemplated that toxicity quotients may be generated (e.g., using similar order parameters to those described above) by other than consolidating broker-dealer 130. In this case, according to various alternative embodiments of the present invention, consolidating broker-dealer 130 would receive one or more toxicity quotients subsequent to their generation by other entities. It should also be noted that, according to at least one embodiment, a previously generated toxicity quotient may be modified. For example, toxicity quotients may be dynamically modified based on events occurring after their initial generation. Using these toxicity quotients (regardless of where they are generated), an order may be examined to determine the likelihood that it will be toxic if executed.

As demonstrated by the various embodiments of the invention described below, toxicity quotients may be useful for a number of different parties in the equities order-flow chain. For example, consolidating broker-dealer 130 may use order-by-order or aggregate toxicity quotient measurements to characterize the quality of individual orders received from OFP 120. This information can be used, for example, to take corrective action to improve the profitability of consolidating broker-dealer 130 on a per order basis and/or aggregate order basis (e.g., by rejecting potentially toxic orders), or in negotiations concerning payment for order flow to OFP 120 (e.g., higher payment for lower toxicity order flow). OFP 120 may use order-by-order, aggregate and/or per account toxicity quotient measurements, for example, to reject potentially toxic orders, to take corrective action against particular users who are submitting unacceptably high levels of orders that are likely to be toxic and/or to provide post order analysis of profitability with respect to order execution and/or future orders. For example, investor 110 may be charged a higher commission based on the determination that a submitted order is likely to be toxic (based on an analysis of the order, market and/or execution parameters). Moreover, knowledge of an order's likelihood of toxicity would allow investor 110 to reconsider an order prior to submission if the order would result in a higher than usual fee (commission).

It will be understood that, when toxicity detection and/or prediction such as described herein is not in place, it is possible that all orders (including normal and potentially toxic orders) sent through the equities market order flow chain will be executed. Upon execution of normal orders, broker-dealer 130 would likely record a trading profit (on average), while upon execution of toxic orders, a reduction in trading profit or a loss would likely result (either directly, or as a result of having to reimburse another entity for taking a trading loss).

Figure 3:
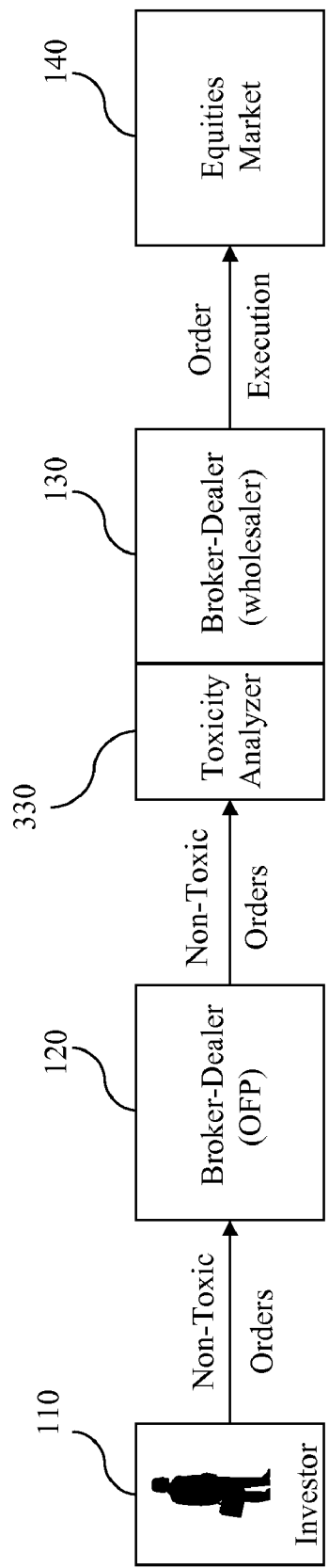
FIG. 3 is a simplified illustration of one example of an order flow in the equities market in which a toxicity analyzer is used according to principles of the present invention.

FIG. 3 shows an illustrative embodiment of the present invention in which consolidating broker-dealer 130 uses a toxicity analyzer 330 to track received equities orders and/or to determine whether (and if so, on what terms) an order should be filled. For example, toxicity analyzer 330 may be used to "screen-out" orders that fit certain criteria characteristic of toxic orders. In other words, for example, if an order is determined to be eligible for execution based on its order characteristics (because it is not likely to be a toxic order), it will be executed. Because the orders received are considered "non-toxic" in the order flow shown in FIG. 3, they are executed. It will be understood that, although it is shown in FIG. 3 that orders eligible for execution are sent by consolidating broker-dealer 130 to equities market 140, the invention is not limited in this manner. For example, as explained above, consolidating broker-dealer 130 may choose to internalize the order (if it has that capability) rather than sending the order to equities market 140. Moreover, it should be noted that toxicity analyzer 330 comprises any standard software program or programs that can be used to analyze the orders with respect to toxicity as described in the various embodiments of the present invention.

Figure 4:
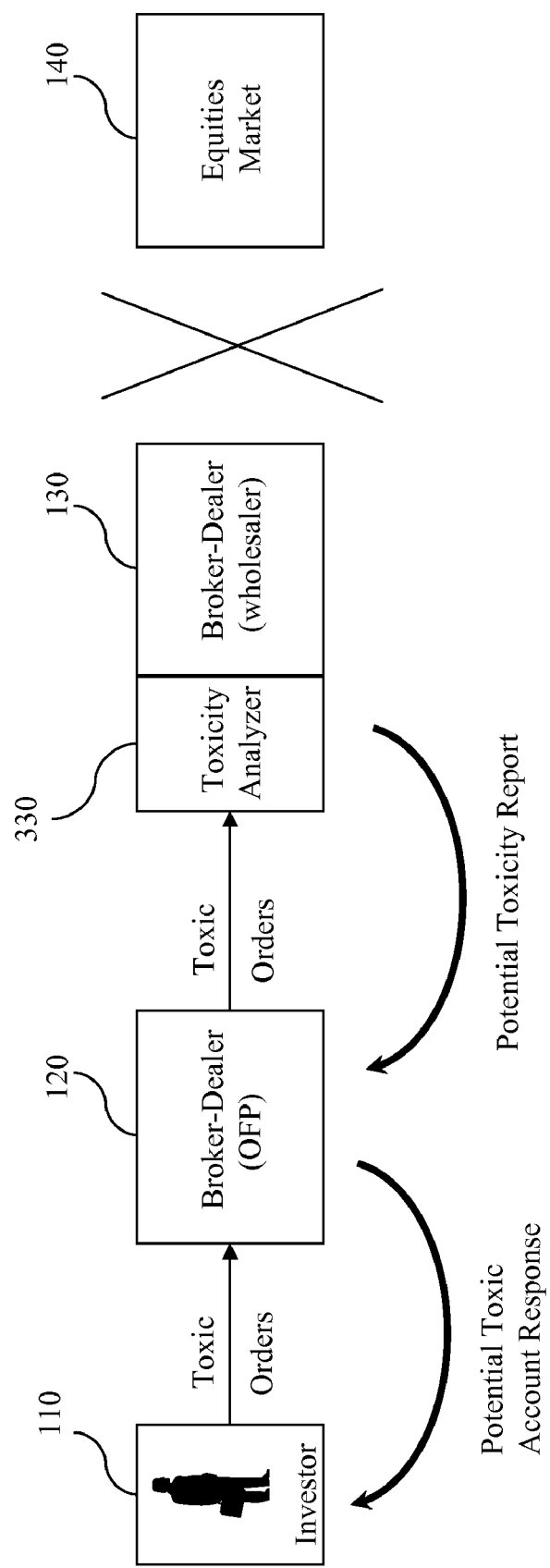
FIG. 4 is a simplified illustration of one example of an order flow in the equities market in which a toxicity analyzer is used according to principles of the present invention.

As shown in FIG. 4, in at least one embodiment, orders received and examined by toxicity analyzer 330 that are determined to be likely toxic (based on an examination of their order parameters) are not executed (e.g., are not sent to an exchange and are not internalized). Alternatively, for example, investor 110 may be given a choice to cancel any ineligible orders, or to agree to their execution at a later time, at another market center, with another market participant, and/or for an increased fee (commission). In addition, as shown in FIG. 4, consolidating broker-dealer 130 may optionally, upon the finding of ineligibility of one or more orders by toxicity analyzer 330, provide a toxicity report to OFP 120. As explained in greater detail below, this report may include, for example, necessary information to identify investor 110 as an investor that submitted one or more orders that are likely to be toxic. In turn, OFP 120 may take corrective action against an investor 110 that is determined to have submitted one or more toxic orders (as also explained in greater detail below). It should be noted that, generally speaking and in at least one embodiment, it would not be desirable to take corrective action against an investor 110 who is determined to be a "naïve" offender. In other words, simply because an investor 110 submits one or more orders that are likely to be toxic (or that in fact turn out to be toxic), it is not necessarily desirable to provide a toxicity report and/or to take corrective action. Rather, these steps are generally intended to be taken in the case of an investor 110 who continuously submits orders that are in fact, or are likely to be, toxic, and/or submits one or more toxic orders for which the trading loss is substantial (a "highly toxic" order). The invention, however, is not limited by the particular situations in which a toxicity report is sent or in which corrective action is taken.

Regardless of whether incoming orders are determined by toxicity analyzer 330 to be toxic, according to various embodiments of the present invention, consolidating broker-dealer 130 may still provide OFP 120 a pre-negotiated, per-order level of payment for order flow. According to various other optional embodiments, such as described below, the payment provided by consolidating broker-dealer 130 to OFP 120 may be at least in part based on the quality (e.g., toxic versus non-toxic) of orders received.

Figure 5:
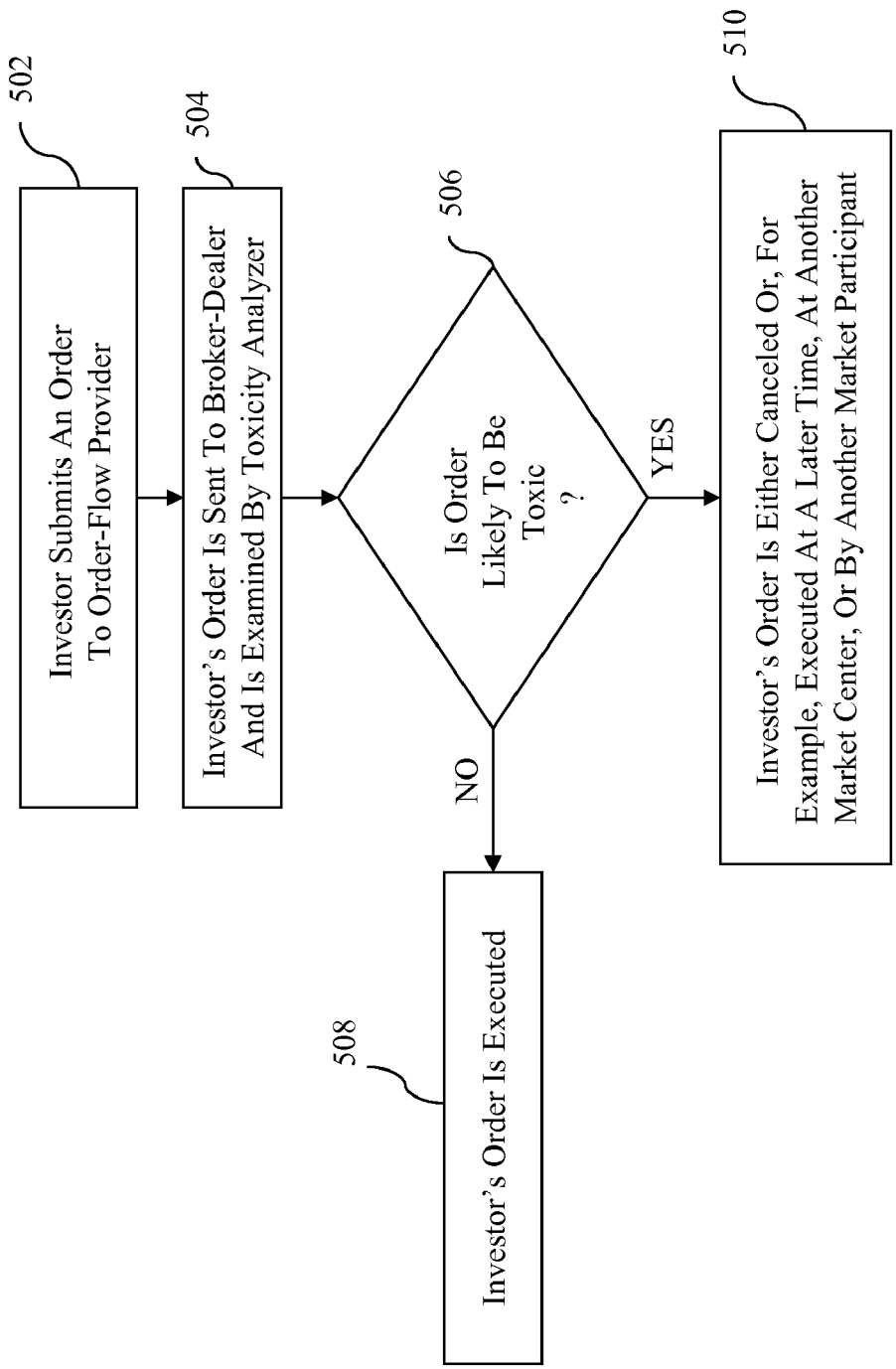
FIG. 5 is a simplified flow chart illustrating the steps performed in the execution of an investor's equities order according to one embodiment of the present invention.

FIG. 5 is a simplified flow chart illustrating the steps performed in the execution of an investor's equities order according to the embodiment of the present invention shown in FIGS. 3-4. In step 502, investor 110 submits an order (e.g., to buy or sell one or more equities) to OFP 120. Next, in step 504, the order is sent by OFP 120 to consolidating broker-dealer 130, at which time it is examined by toxicity analyzer 330. If it is determined at step 506 that the order submitted by investor 110 is not toxic, the order is executed at step 508 (e.g., by sending the order to an exchange or internalizing the order, and with or without, for example, a time and/or price guarantee). Otherwise, if the order is determined to be toxic at step 506, at step 510, the order submitted by investor 110 is either rejected or, for example, it is executed at a later time, at another market center, with another market participant, and/or for an increased fee (commission).

Figure 6:
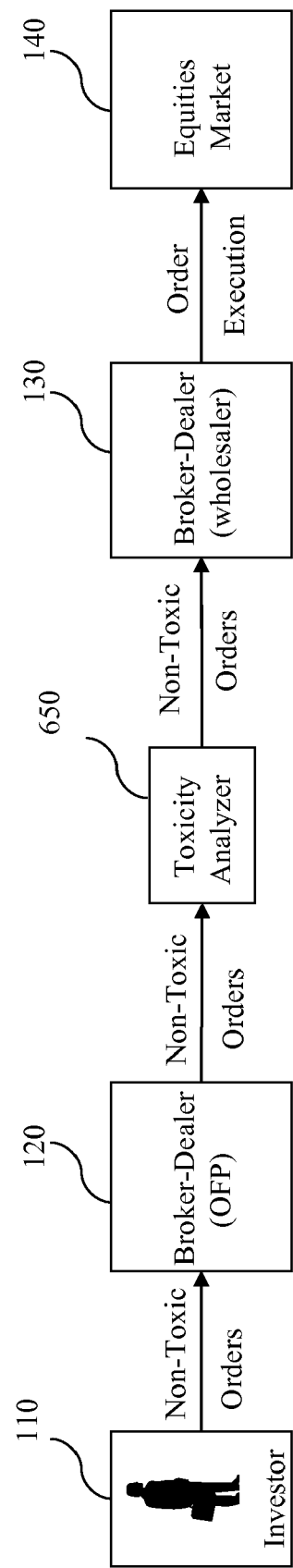
FIG. 6 is a simplified illustration of one example of an order flow in the equities market in which a toxicity analyzer is used according to principles of the present invention.
Figure 7:
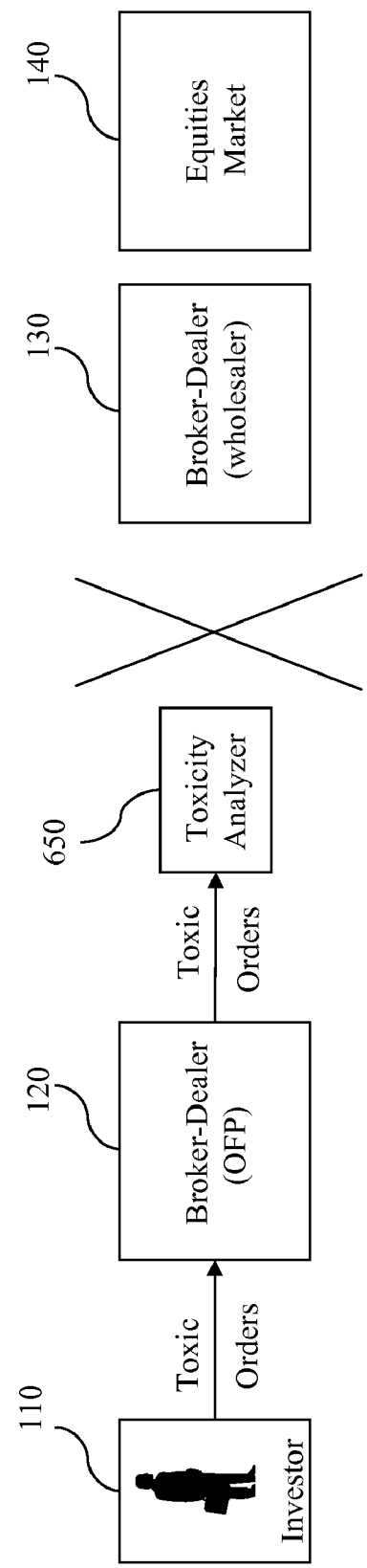
FIG. 7 is a simplified illustration of one example of an order flow in the equities market in which a toxicity analyzer is used according to principles of the present invention.
Figure 8:
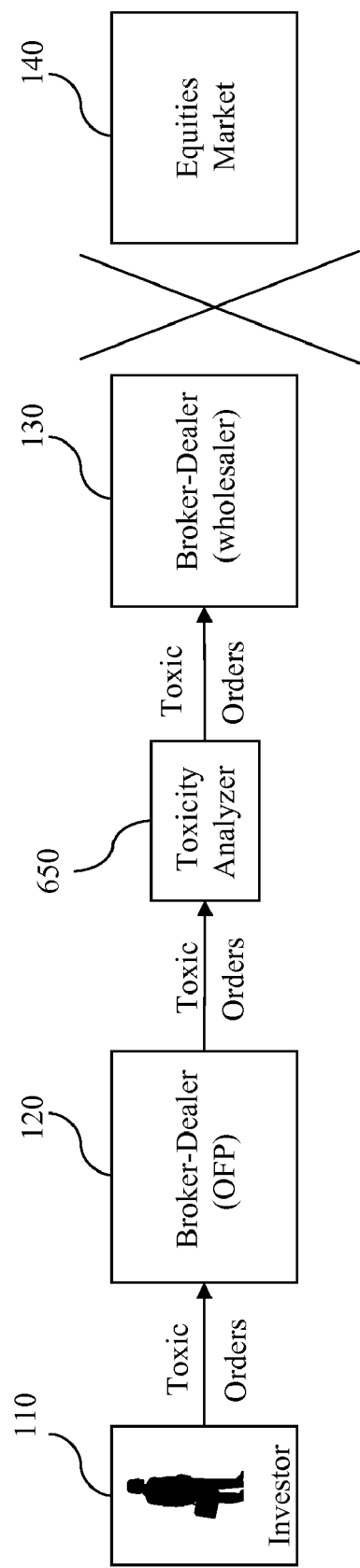
FIG. 8 is a simplified illustration of one example of an order flow in the equities market in which a toxicity analyzer is used according to principles of the present invention.

In the embodiments of the invention shown in FIGS. 3-4, toxicity analyzer 330 is a part of (e.g., owned by the same entity as) consolidating broker-dealer 130. The invention, however, is not limited in this manner. For example, a stand alone toxicity analyzer may be used according to the invention. In this case, the toxicity analyzer may be, for example, completely independent from, or associated with (e.g., under the control of), consolidating broker-dealer 130. FIG. 6 shows one example of an equities order flow in which such a stand alone toxicity analyzer 650 is used. As shown, non-toxic orders submitted by investor 110 (and sent by OFP 120) are received by toxicity analyzer 650, and are thereafter submitted for execution by consolidating broker-dealer 130. When toxicity analyzer 650 determines that one or more received orders are likely to be toxic, as shown in FIG. 7, the orders are not submitted to consolidating broker-dealer 130. Alternatively, as shown in FIG. 8, the orders deemed likely toxic may nonetheless be passed to consolidating broker-dealer 130. In this case, however, based on instructions from toxicity analyzer 650 (or from some other entity, but still based, at least in part, on the determination by toxicity analyzer 650), consolidating broker-dealer 130 will generally not execute the order as submitted by investor 110. For example, as mentioned above, the order may be rejected, filled at a later time, filled at another market center, filled by another market participant and/or filled for a higher fee (commission). Although not indicated in FIGS. 7-8, it will be understood that, as described above in connection with FIG. 4, a toxicity report may be provided to OFP 120 in response to the detection of likely toxic orders, and OFP 120 may take corrective action against an investor 110 that is determined to have submitted one or more likely toxic orders.

Figure 9:
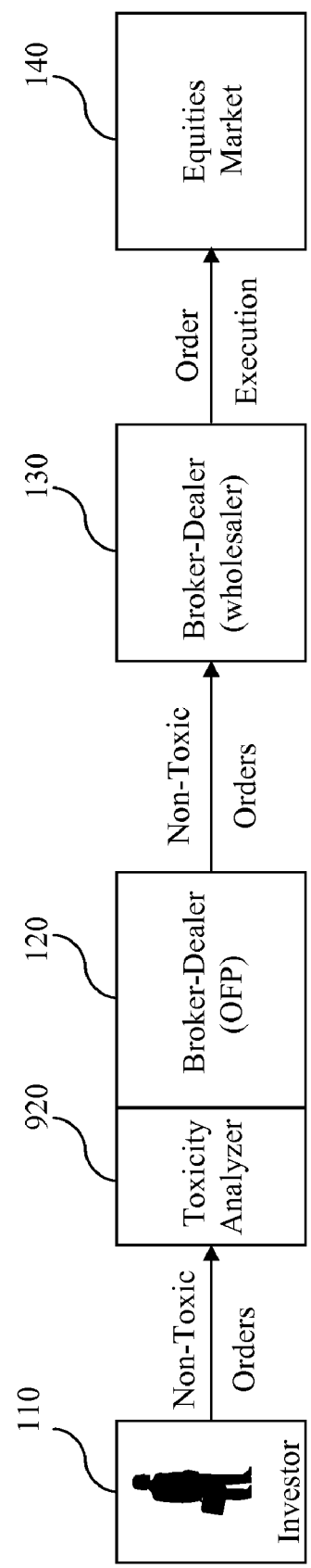
FIG. 9 is a simplified illustration of one example of an order flow in the equities market in which a toxicity analyzer is used according to principles of the present invention.

As shown in FIG. 9, according to another embodiment of the invention, a toxicity analyzer 920, which is a part of OFP 120, may be used in place of, and/or in combination with, toxicity analyzers 330 and 650 shown in FIGS. 3-4 and 6-8, respectively, and described above. In this manner, by using toxicity analyzer 920, it is possible to examine some or all orders being sent to OFP 120 for potential toxicity (and to potentially cancel or modify such orders) before they are sent to consolidating broker-dealer 130. As shown in FIG. 9, non-toxic orders are eventually received by consolidating broker-dealer 130, and are generally executed.

Figure 10:
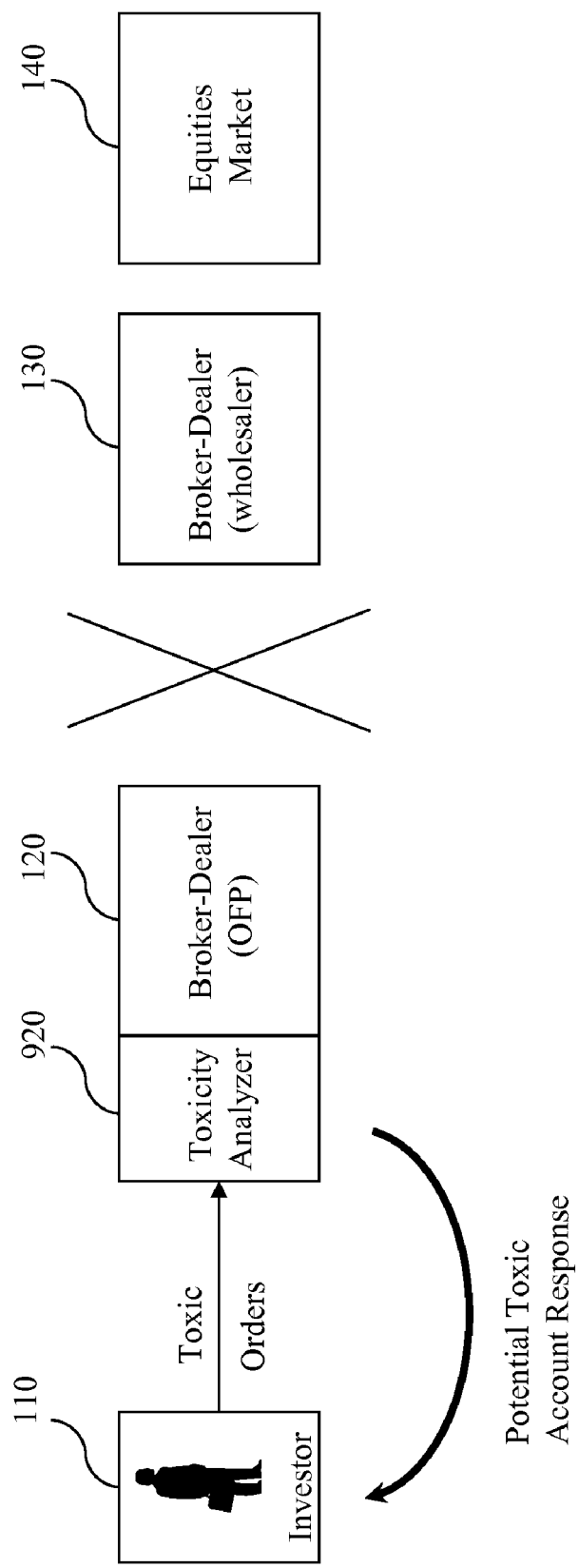
FIG. 10 is a simplified illustration of one example of an order flow in the equities market in which a toxicity analyzer is used according to principles of the present invention.

As shown in FIG. 10, orders received and examined by toxicity analyzer 1020 that are determined to be ineligible for execution based on their order characteristics are not provided to consolidating broker-dealer 130. Alternatively, for example, investor 110 may be given a choice to either cancel any ineligible orders, or, when provided the option, to agree to their execution, for example, at a later time, at another market center, with another market participant and/or for an increased fee (commission). In this case, although not shown in FIG. 10, the orders may be provided to consolidating broker-dealer 130 for execution according to the new terms. In addition, as shown in FIG. 10, OFP 120 may take corrective action against an investor 110 that is determined to have submitted one or more toxic orders (as also explained in greater detail below). According to various embodiments, regardless of whether incoming orders are passed on to consolidating broker-dealer 130 or rejected due to suspected toxicity, consolidating broker-dealer 130 may still provide OFP 120 a pre-negotiated per-order level of payment. According to various other embodiments, such as described below, the payment provided by consolidating broker-dealer 130 to OFP 120 may be at least in part based on the quality (e.g., toxic versus non-toxic) of orders received.

Figure 11:
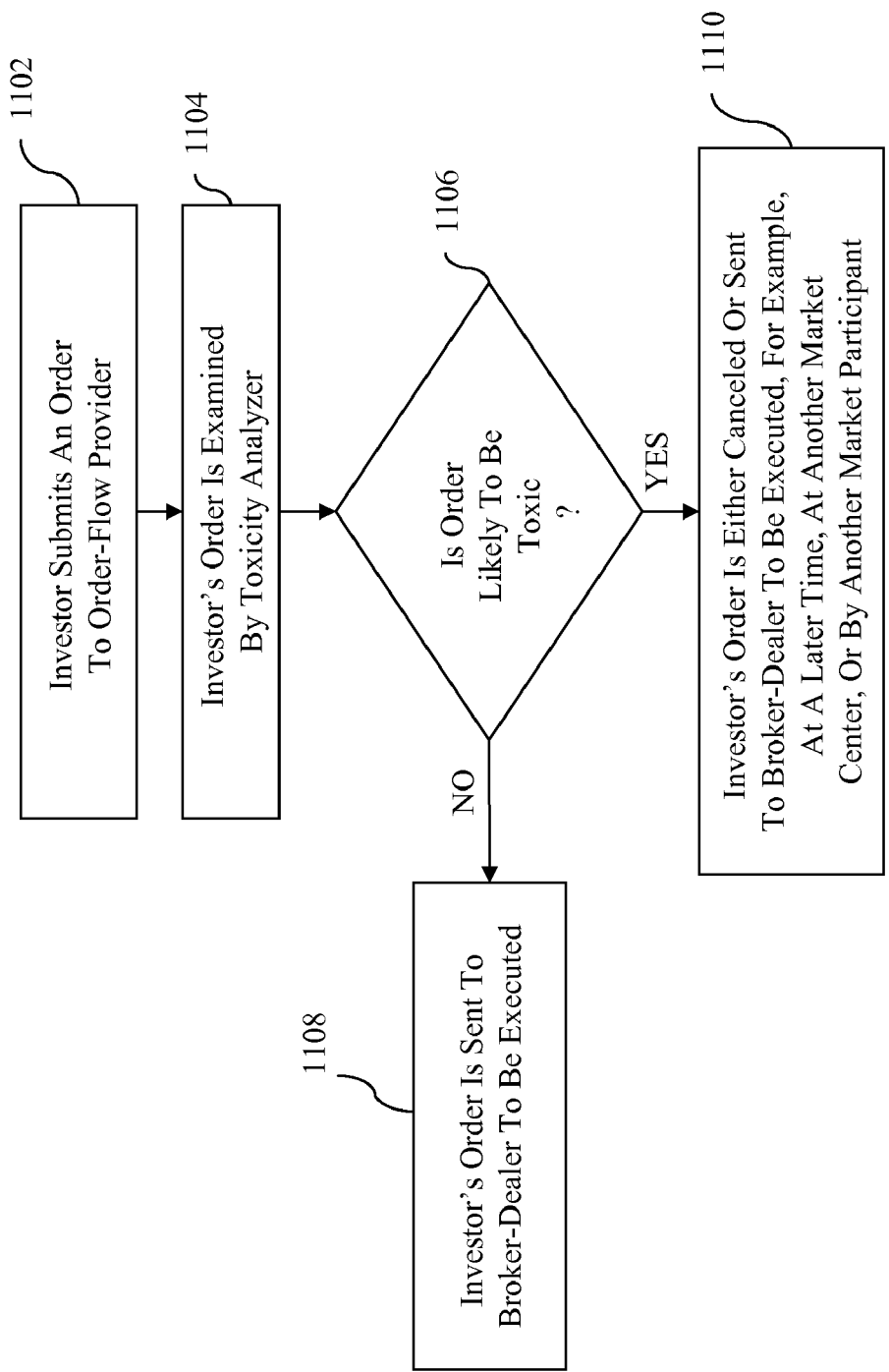
FIG. 11 is a simplified flow chart illustrating the steps performed in the execution of an investor's equities order according to another embodiment of the present invention.

FIG. 11 is a simplified flow chart illustrating the steps performed in the execution of an investor's equities order according to the embodiment of the present invention shown in FIGS. 9-10. In step 1102, investor 110 submits an order (e.g., to buy or sell one or more equities) to OFP 120. Next, in step 1104, the order is examined by toxicity analyzer 920. If it is determined at step 1106 that the order submitted by investor 110 is not toxic, the order may be sent to consolidating broker-dealer 130 to be executed. Otherwise, if the order is determined to be toxic at step 1106, at step 1110, the order submitted by investor 110 is either rejected or, for example, it is sent to consolidating broker-dealer 130 to be executed at a later time, at another market center, with another market participant, and/or for an increased fee (commission).

Figure 12:
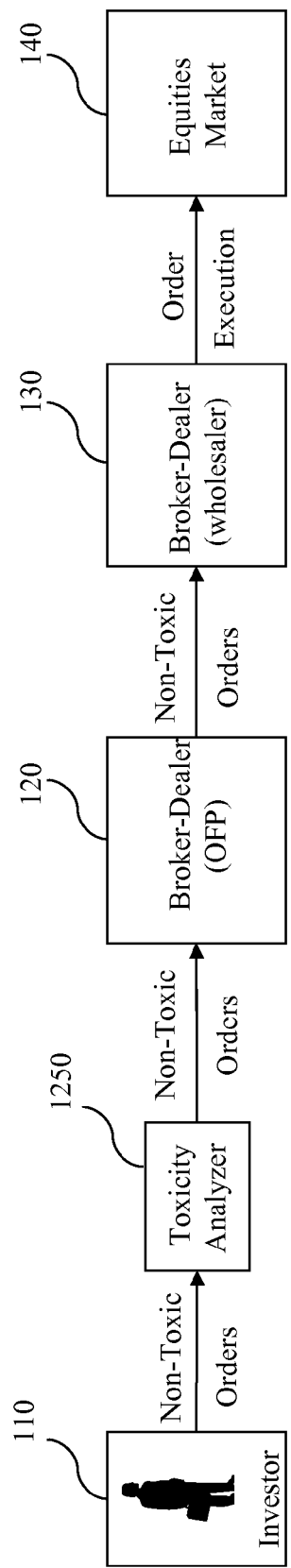
FIG. 12 is a simplified illustration of one example of an order flow in the equities market in which a toxicity analyzer is used according to principles of the present invention.
Figure 13:
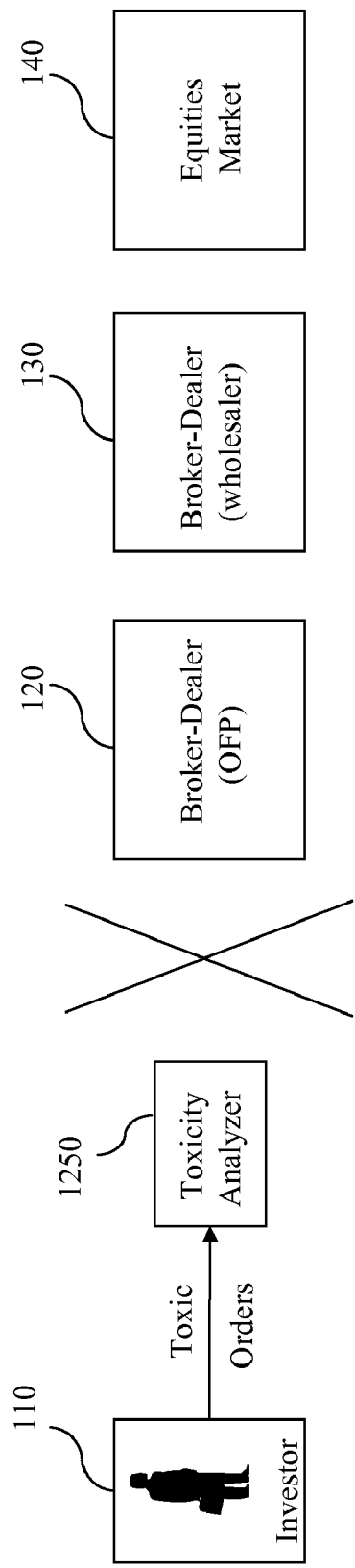
FIG. 13 is a simplified illustration of one example of an order flow in the equities market in which a toxicity analyzer is used according to principles of the present invention.
Figure 14:
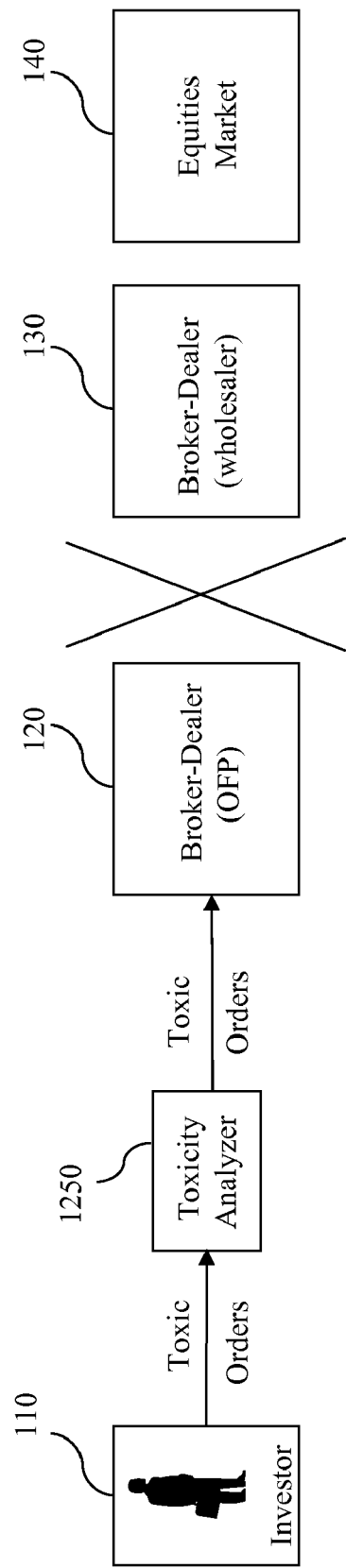
FIG. 14 is a simplified illustration of one example of an order flow in the equities market in which a toxicity analyzer is used according to principles of the present invention.

In the embodiments of the invention shown in FIGS. 9-10, toxicity analyzer 920 is a part of (e.g., owned by the same entity as) OFP 120. The invention, however, is not limited in this manner. For example, a stand alone toxicity analyzer situated between investor 110 and OFP 120 may be used according to the invention. In this case, the toxicity analyzer may be, for example, completely independent from, and/or associated with (e.g., under the control of), OFP 120. FIG. 12 shows one example of an order flow in which such a stand alone toxicity analyzer 1250 is used that is situated between investor 110 and OFP 120. As shown, non-toxic orders submitted by investor 110 are received by toxicity analyzer 1250, and are thereafter submitted for execution by consolidating broker-dealer 130. When toxicity analyzer 1250 determines that one or more received orders are not eligible for execution (e.g., because they are toxic), as shown in FIG. 13, the orders are not submitted to OFP 120. Alternatively, as shown in FIG. 14, the orders deemed ineligible for execution may nonetheless be passed to OFP 120. In this case, however, based on instructions from toxicity analyzer 1250 (or from some other entity, but still based on the determination by toxicity analyzer 1250), OFP 120 generally will not pass the order as submitted by investor 110 to consolidating broker-dealer 130 for execution. Rather, as mentioned above, the order may be either rejected, or, for example, filled at a later time, at another market center, with another market participant, and/or for a higher fee (commission). Moreover, although not indicated in FIGS. 13-14, as described above in connection with FIG. 6, OFP 120 may take corrective action against an investor 110 that is determined to have submitted one or more toxic orders.

The present invention also provides profitability measurement methods and systems that may be used to eliminate, or at least reduce, the financial risk associated with execution of toxic orders. As explained above, the profit which consolidating broker-dealer 130 makes on the execution of a given equities order may be at least partially dependent on the spread between the bid and offer quotes (e.g., when the order is internalized by consolidating broker-dealer 130). Moreover, as previously noted, there may be instances when this profit (for consolidating broker-dealer 130 and/or another participant in the equities order flow) is reduced, approaches zero, and/or becomes a loss. According to the present invention, broker-dealer profit information coupled with market condition information (either instantaneous or averaged over some time period) can be used to characterize the quality of an individual order or flow of orders. Moreover, while profit (or loss) on a trade can only be determined after a trade has been executed, and thus a profit measure could not be used to stop the execution of unprofitable orders, it could have tremendous utility in motivating behaviors at the OFP or investor level by providing a parameter to drive the setting of transaction (e.g., payment for order flow) and investor commission fees. For example, a profit analyzer according to the invention may be used to monitor the outcome of some or all trades that are received by a consolidating broker-dealer and that are subsequently executed. By logging the bid/offer spread at the time of order filling for each equity trade executed, a running tab of profit (or loss) can be kept. Moreover, by monitoring average trading volume and average per trade-profit over various periods of time (days, weeks, or months), an expected level of profit can be established for various OFPs. Deviations from these averages could then be used to signal the need to take corrective action against a particular OFP or investor (e.g., to adjust payment for order flow to the OFP).

Figure 15:
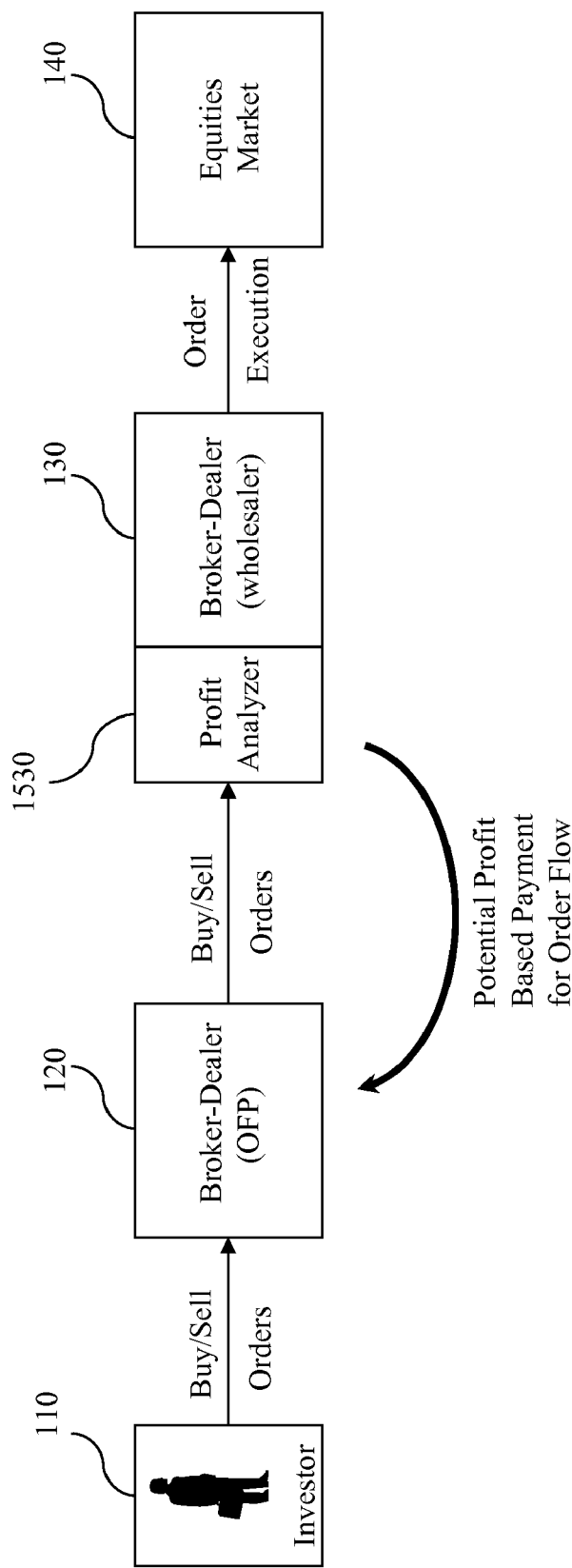
FIG. 15 is a simplified illustration of one example of an order flow in the equities market in which a profit analyzer is used according to principles of the present invention.

FIG. 15 shows an order flow in which a profit analyzer 1530 is used according to another embodiment of the invention. In this embodiment, optionally, execution is provided to a majority (or all) of the received orders from investor 110. Moreover, the fee structure with OFP 120 is based on a measure of profitability for consolidating broker-dealer 130. By using profit analyzer 1530 to monitor all (or at least a percentage of) executed trades in which consolidating broker-dealer 130 is involved, it is possible for consolidating broker-dealer 130 to track its level of profitability (e.g., in real-time, and/or over a certain period of time). By making the amount of payment provided to OFP 120 in exchange for order flow variable and a function of the profit ultimately realized by consolidating broker-dealer 130, at least some of the risk for loss (e.g., based on toxic trades) may be shifted to OFP 120. This shifting of risk in turn aligns the objectives of OFP 120 with those of consolidating broker-dealer 130 (e.g., lower toxicity order flow results in greater profit for OFP 120).

Although FIG. 15 shows profit analyzer 1530 as being a part of (e.g., owned by the same entity as) consolidating broker-dealer 130, the invention is not limited in this manner. For example, although not shown, a stand alone profit analyzer may be used according to other embodiments of the invention. In this case, the profit analyzer may be, for example, completely independent from, or associated with (e.g., under the control of), consolidating broker-dealer 130.

Figure 16:
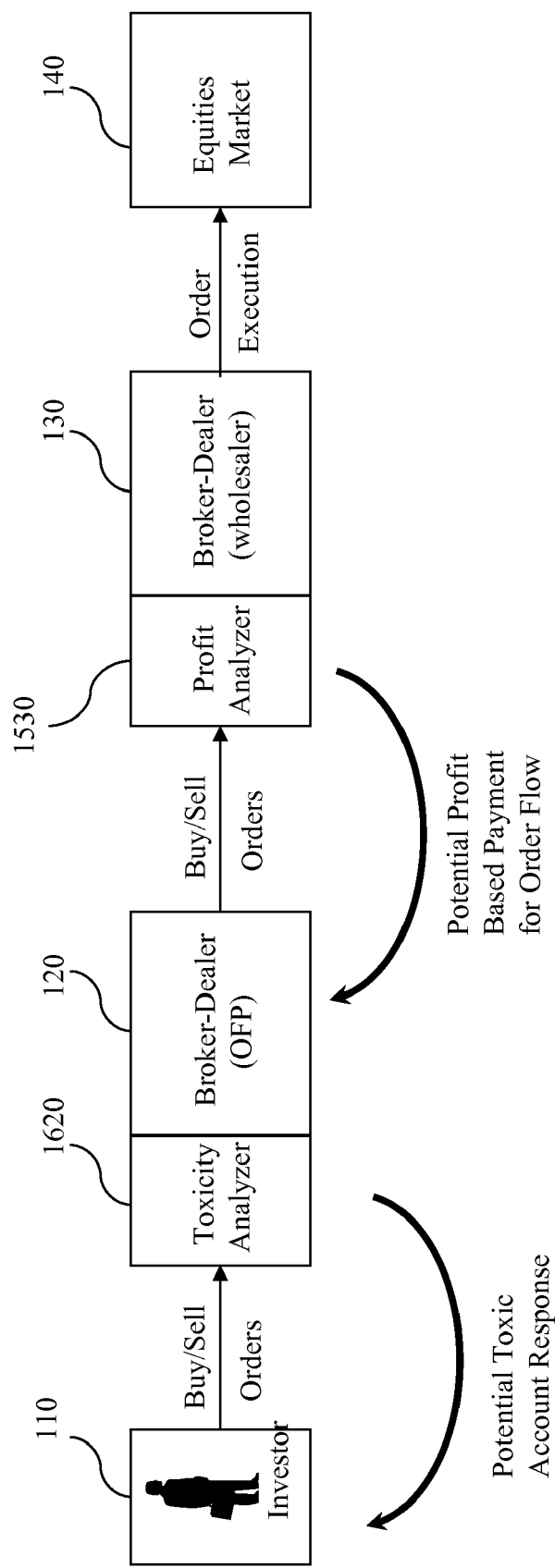
FIG. 16 is a simplified illustration of one example of an order flow in the equities market in which a toxicity analyzer and a profit analyzer are used according to principles of the present invention.

As shown in FIG. 16, according to another embodiment of the present invention, both a toxicity analyzer 1620 and profit analyzer 1530 may be used in the same order flow. In this case, as described above in connection with FIG. 15, profit analyzer 1530 is used to track the execution of each trade received by consolidating broker-dealer 130, monitoring the real-time and/or aggregate level of profitability. Accordingly, it is possible for the payment from consolidating broker-dealer 130 to OFP 120 to be variable and based on the profit realized by the order flow received by consolidating broker-dealer 130. Moreover, using toxicity analyzer 1620 (or another toxicity analyzer which may be, for example, a stand alone toxicity analyzer), orders which are determined to be likely toxic may be canceled by OFP 120, or modified, as described above. In addition, based on the toxic orders received from investor 110 (regardless of whether they are actually executed), OFP 120 may take corrective action against investor 110. For example, OFP 120 may increase the transaction fees for orders placed by investor 110, ban investor 110 altogether from trading through OFP 120, or restrict the orders that will be accepted from investor 110 (e.g., based on order size, symbol, etc.).

Figure 17:
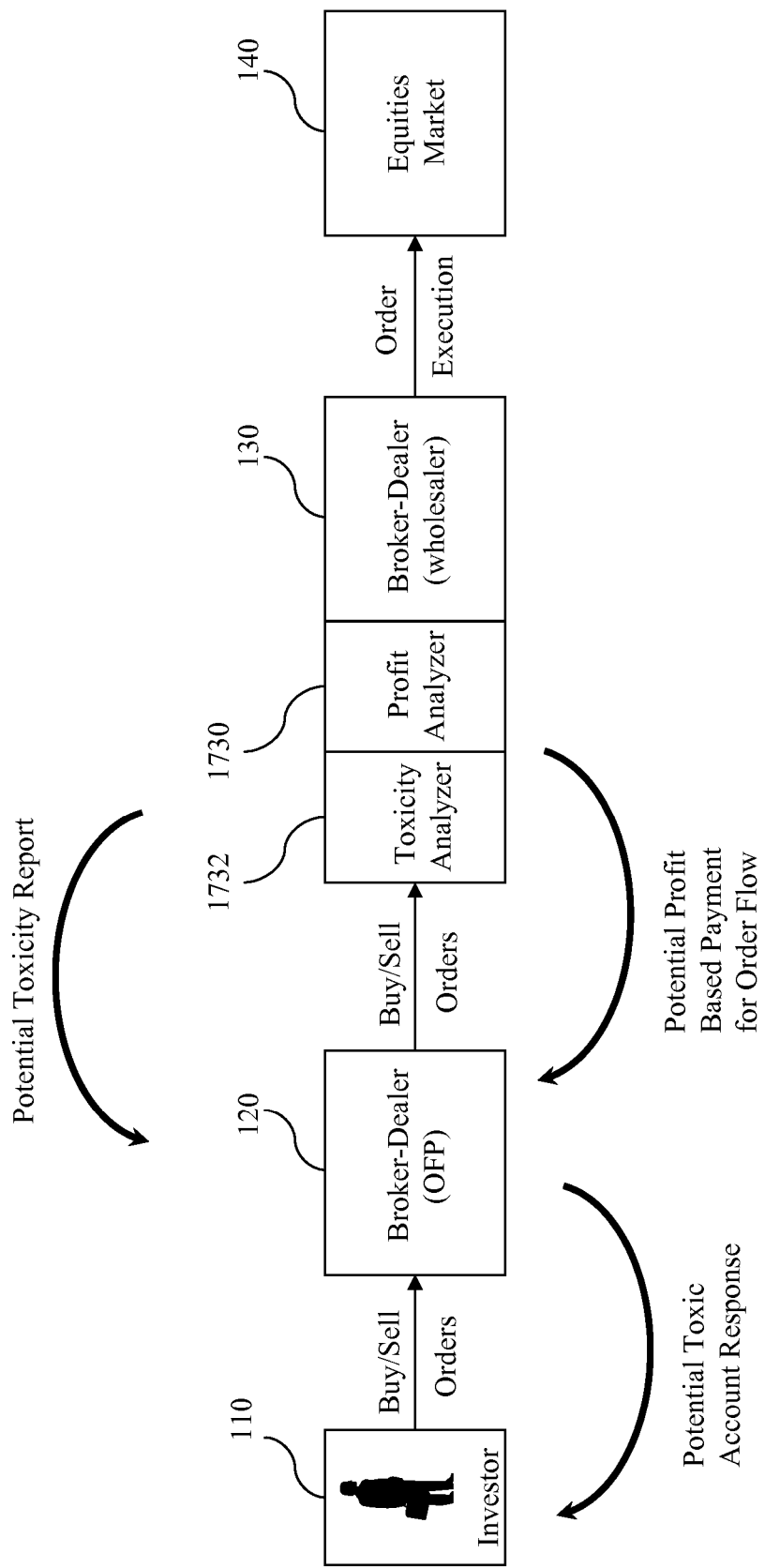
FIG. 17 is a simplified illustration of another example of an order flow in the equities market in which a toxicity analyzer and a profit analyzer are used according to principles of the present invention.

FIG. 17 shows another embodiment of the invention in which a profit analyzer 1730 and toxicity analyzer 1732 are used in the same order flow. As with profit analyzer 1530 of FIG. 16, profit analyzer 1730 is used to track the execution of all (or at least a percentage of) of the trades received by consolidating broker-dealer 130, monitoring the real-time and/or aggregate level of profitability. Accordingly, it is possible for the payment from consolidating broker-dealer 130 to OFP 120 to be variable and based on the profit realized by the order flow received by consolidating broker-dealer 130. Moreover, using toxicity analyzer 1732 (or another toxicity analyzer which may be, for example, a stand alone toxicity analyzer), orders which are determined to be likely toxic may be rejected by consolidating broker-dealer 130, or modified, as described above. In addition, following the receipt of one or more orders determined to be toxic (regardless of whether they are actually executed and found to be actually toxic), consolidating broker-dealer 130 may provide a toxicity report to OFP 120. This report may include necessary information to identify investor 110 as an investor that submitted one or more likely (or actually) toxic orders. For example, this information may include the account number of the offending investor (if available to consolidating broker-dealer 130), the encoded account number (if OFP 120 provides consolidating broker-dealer 130 with an identification code that can be used by OFP 120 to identify the underlying account), and/or the order number (if OFP 120 keeps track of which order numbers are associated with which underlying accounts). In turn, OFP 120 may take corrective action against an investor 110 that is determined to have submitted one or more likely (or actually) toxic orders. As explained above, this may include, so long as otherwise consistent with applicable securities regulation, increasing the transaction fees for orders placed by investor 110, banning investor 110 altogether from trading through OFP 120, or restricting the orders that will be accepted from investor 110 (e.g., based on order size, symbol, etc.).

According to various alternate embodiments of the invention, a set of rules ("rule-set") may be used in conjunction with, or in place of, one or more order toxicity analyzers such as the ones shown in FIGS. 3-4, 6-10, 12-14, and 16-17 and described above. For example, as shown in the illustrative order flow of FIG. 18, it is determined by system 1850 for all and/or predetermined orders arriving from OFP 120 whether the order complies with the rule-set (e.g., the size of the order is below a threshold level, the investor submitting the order is one of a pre-approved list of investors, etc.). It will be understood that the rule-set described above may be modified at any suitable time. For example, the rule-set may be modified based on past, present, or expected future market conditions, past profit measurements, and/or other received information (e.g., from outside the equities order flow). Moreover, it should be noted that the order flow shown in FIG. 18 is substantially the same as the order flow shown in FIG. 3, except that toxicity analyzer 330 is replaced by system 1850.

Figure 18:
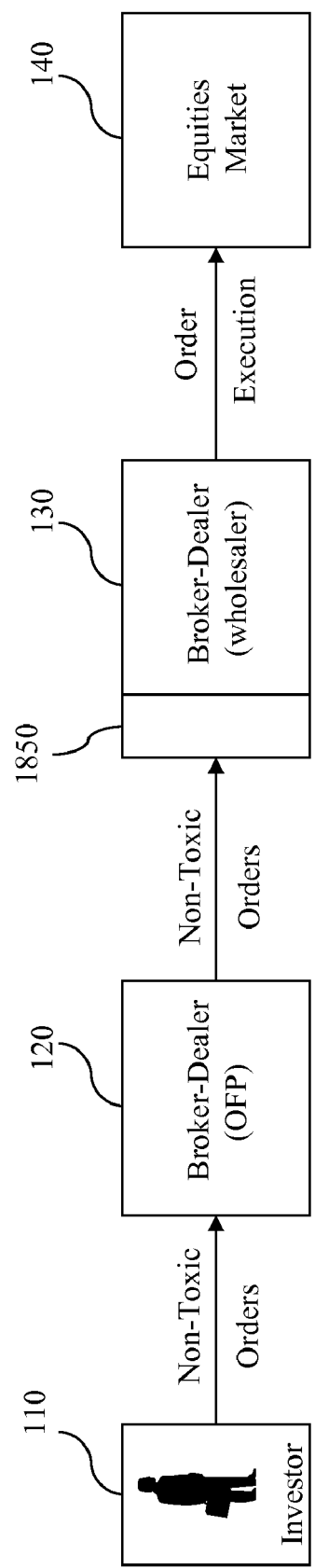
FIG. 18 is a simplified illustration of one example of an order flow in the equities market in which a system for determining whether an order complies with a rule-set is used according to the principles of the present invention.

In the embodiment shown in FIG. 18, if an order from investor 110 complies with the rule-set, then the order may be executed. Otherwise, pursuant to a previous agreement with investor 110, for example, the order may be rejected, with or without feedback to investor 110. In other embodiments, for example, investor 110 may be given an opportunity to modify the order such that it complies with the rule-set, to accept a modified order that complies with the rule-set, or to accept the order with an increased fee (commission). In yet other embodiments, also pursuant to a prior agreement with investor 110, for example, the order placed by investor 110 may be automatically modified (e.g., by reducing the order size) so that it complies with the rule-set and then executed. In this case, investor 110 may be notified of the modification to the original order (and/or provided other information) before or after execution of the modified order.

System 1850 shown in FIG. 18 may be, for example, a computer implemented system that analyzes various characteristics of orders originating from investor 110 to determine whether the order complies with the rule-set. Moreover, as shown in FIG. 18, system 1850 may be a part of, or associated with, consolidating broker-dealer 130. The invention is not limited in this manner.

Figure 19:
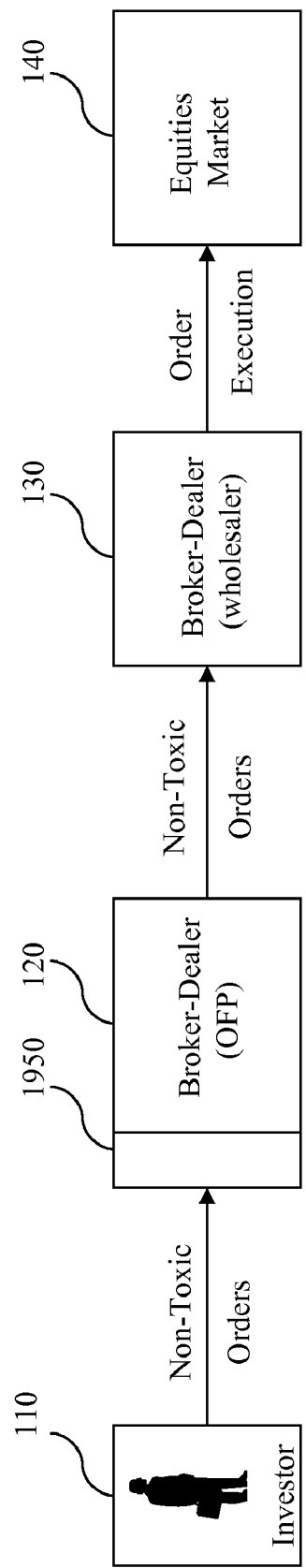
FIG. 19 is a simplified illustration of one example of an order flow in the equities market in which a system for determining whether an order complies with a rule-set is used according to the principles of the present invention.

According to another embodiment of the invention, a system 1950 as shown in FIG. 19 may be used in place of system 1850 shown in FIG. 18 and described above. Similar to system 1850, system 1950 shown in FIG. 19 may be used to determine for all and/or predetermined orders arriving from investor 110 whether the order complies with the rule-set. If the order complies with the rule-set, then it may be sent to consolidating broker-dealer 130 for execution. Otherwise, for example, it may be rejected, with or without notification to investor 110 (e.g., pursuant to a prior agreement with investor 110). In other embodiments, for example, investor 110 may be given an opportunity to modify the order, to accept a modified order that complies with the rule-set, or to accept the order with an increased fee (commission). Alternatively, also pursuant to a prior agreement, for example, the order may be automatically modified (e.g., by reducing the order size) so that it complies with the rule-set, and may then be automatically executed (with or without notification of the modification to investor 110).

System 1950 shown in FIG. 19 may be, for example, a computer implemented system that analyzes various characteristics of orders originating from investor 110 to determine whether the order complies with the rule-set. Moreover, as shown in FIG. 19, system 1950 may be a part of, or associated with, OFP 120. The invention is not limited in these manners.

Often, the risk of executing a toxic trade rests with OFP 120 or consolidating broker-dealer 130 (or an affiliate). However, there are many times during which the risk may reside completely or at least partially with an exchange (or exchange participant) of equities market 140 (e.g., when the profit or loss is based on the bid-offer spread). At these times, it may be desirable for such an exchange to incorporate customer analytic systems such as described above into its order routing and execution mechanisms. Accordingly, while the above description of the invention focuses on the use of toxicity analyzers, profit analyzers, and/or systems for determining compliance with a rule-set by one or both of OFP 120 and consolidating broker-dealer 130, it will be understood that the invention is not limited in this manner.

Figure 20:
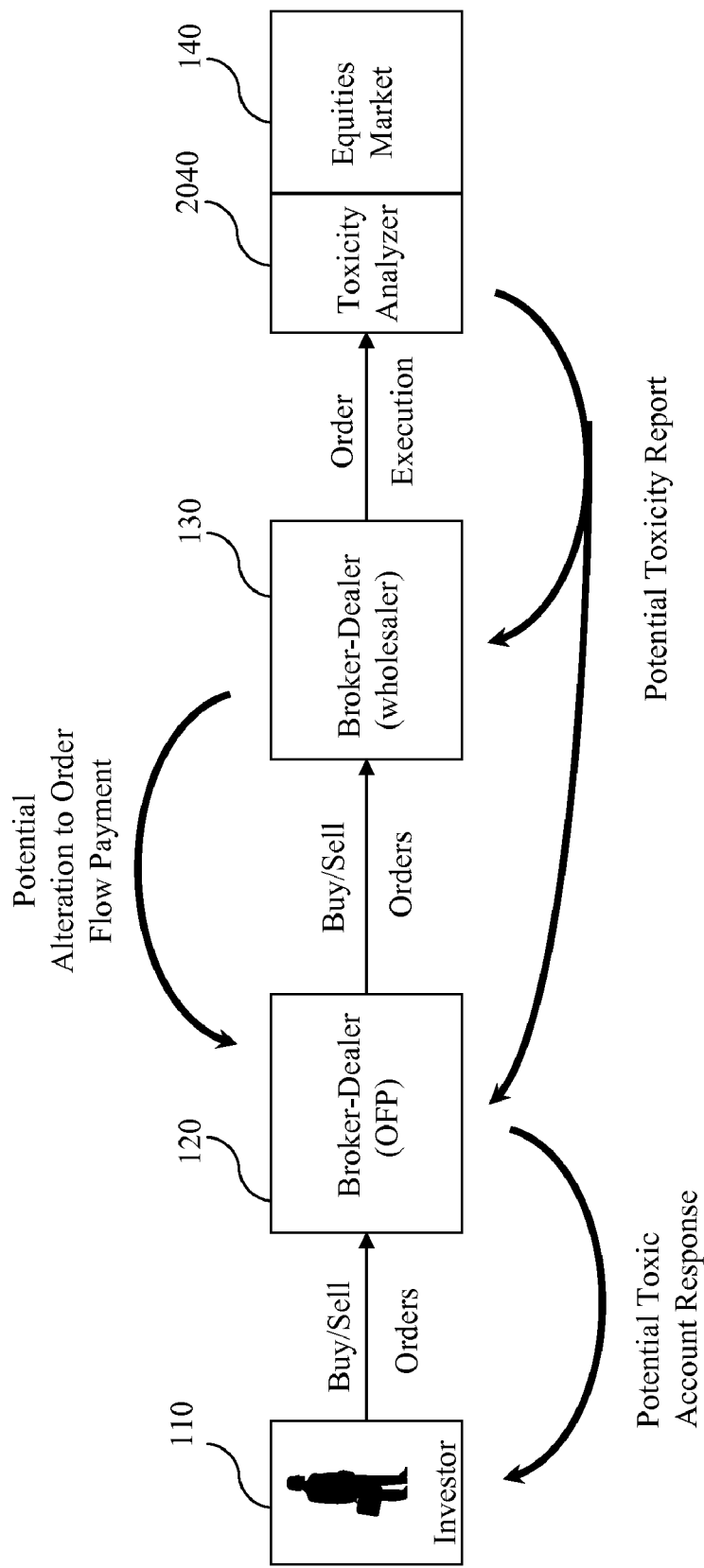
FIG. 20 is a simplified illustration of one example of an order flow in the equities market in which a toxicity analyzer is used according to principles of the present invention.

As illustrated by FIG. 20, one or more exchanges of equities market 140 may use a toxicity analyzer 2040 to track received equities orders and/or to determine whether, and if so, on what terms, an order should be filled (e.g., routed to a specialist on the exchange). When a likely toxic order is submitted to an exchange, as determined by, e.g., toxicity analyzer 2040, the exchange may take any of the approaches described above, including canceling or rejecting the order, executing the order at a later time, automatically altering the order, and/or allowing the investor to alter the order prior to execution. In addition, upon the finding of ineligibility (likely toxicity) of one or more orders by toxicity analyzer 2040, regardless of whether the orders are executed, the exchange can provide a toxicity report to OFP 120 (either directly or through consolidating broker-dealer 130). Using this toxicity report, as explained above, OFP 120 can take corrective action against investor 110, for example, by increasing the transaction fees for orders placed by investor 110, by banning investor 110 altogether from trading through OFP 120, or restricting the orders that will be accepted from investor 110 (e.g., based on order size, symbol, etc.). In addition, the exchange using toxicity analyzer 2040 can provide a toxicity report specifically intended for consolidating broker-dealer 130. Using this report, for example, consolidating broker-dealer 130 may decide to alter its order flow payments to OFP 120, thereby providing incentive for OFP 120 to provide a lower toxicity order flow. It will be understood that toxicity analyzer 1940 can be a part of (e.g., owned by the same entity as) the exchange of equities market 140 that is using it, or, for example, may be completely independent from, or associated with (e.g., under the control of), that exchange. The invention is not limited in this manner.

Figure 21:
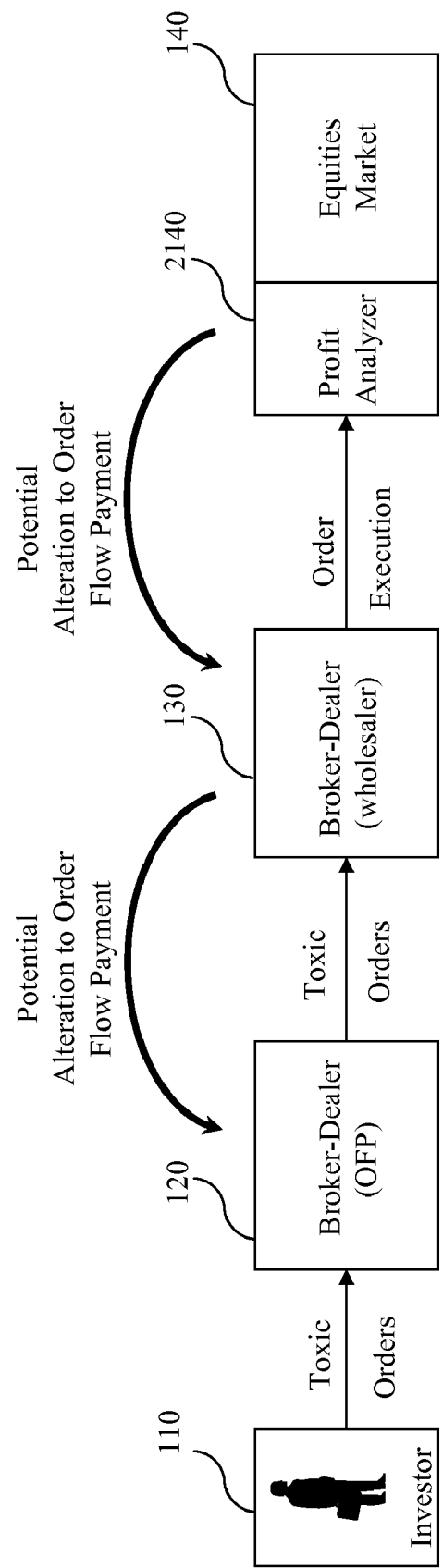
FIG. 21 is a simplified illustration of one example of an order flow in the equities market in which a profit analyzer is used according to principles of the present invention.

According to the invention, as shown in FIG. 21, an exchange of equities market 140 may use profit analyzer 2140 to track profit and loss on some or all executed trades, similar to the manner in which profit analyzer 1530 is used by consolidating broker-dealer according to the embodiment of the invention shown in FIG. 15. As explained above, an exchange of equities market 140 may pay consolidating broker-dealer 130 for routing order flow to its marketplace. According to the invention, measurements made by profit analyzer 2040 can be used to modify such payment based on the toxicity level of the received order flow. In this manner, the exchange, using profit analyzer 2040, is able to induce consolidating broker-dealer 130 to provide a low toxicity order flow. For example, when toxic orders are executed by the exchange, the exchange (using profit analyzer 2040) will record a reduction in profit (or a loss). In response, for example, the exchange may alter its payment to consolidating broker-dealer 130 for that order flow and/or for future order flow. In turn, consolidating broker-dealer 130 may decide to alter the level of its payment for order flow to the OFP 120 that sent the one or more toxic orders (originating from investor 110). It will be understood that profit analyzer 2040 can be a part of (e.g., owned by the same entity as) the exchange of equities market 140 that is using it. Alternatively, for example, profit analyzer 2040 may be completely independent from, or associated with (e.g., under the control of), that exchange. The invention is not limited in this manner.

Figure 22:
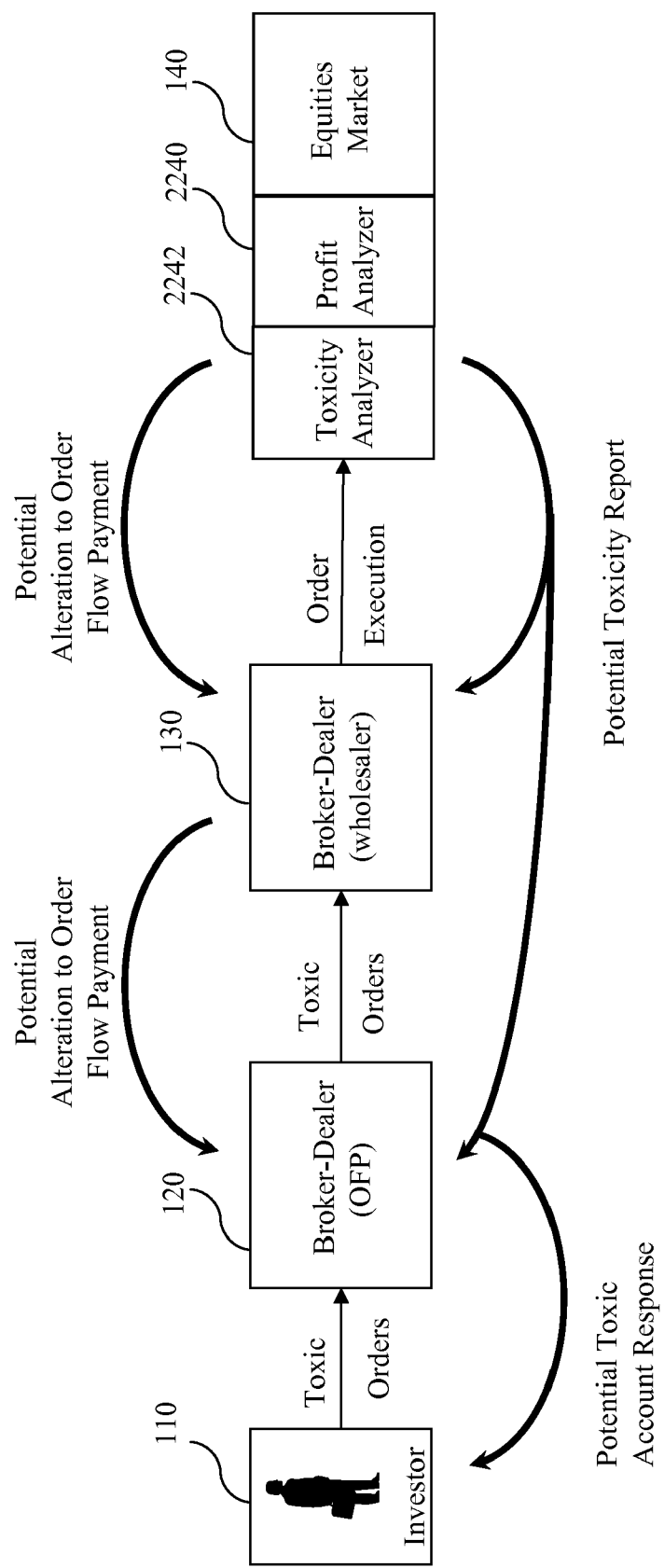
FIG. 22 is a simplified illustration of one example of an order flow in the equities market in which a toxicity analyzer and a profit analyzer are used according to principles of the present invention.

According to various other embodiments of the invention, such as that shown in FIG. 22, an exchange of equities market 140 can make use of both a profit analyzer 2240 and a toxicity analyzer 2142. In this case, using profit analyzer 2240, the exchange is able to, for example, track profit based on a received order flow and adjust payments to consolidating broker-dealer 130 (which may then adjust payment to OFP 120). In addition, using toxicity analyzer 2242, the exchange can, for example, provide toxicity reports to OFP 120 and/or consolidating broker-dealer 130 as described above. In the case of a toxicity report received by OFP 120, the report can be used to take corrective action against investor 110 (as described above). In the case of a toxicity report received by consolidating broker-dealer 130, for example, consolidating broker-dealer 130 can use the report to adjust payment to the OFP 120. All suitable uses of toxicity and profit analyzers described above apply in the case of an exchange using these analyzers (e.g., as shown in FIG. 22).

Figure 23:
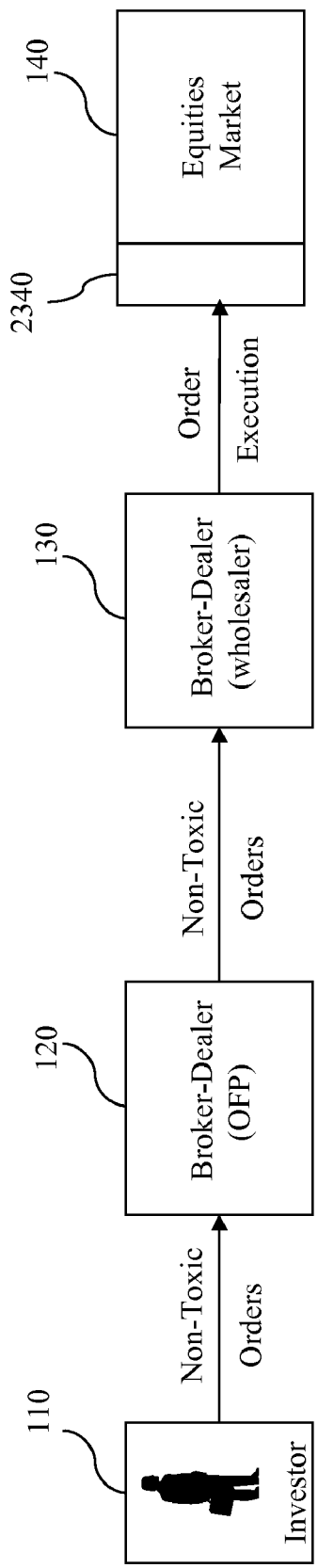
FIG. 23 is a simplified illustration of one example of an order flow in the equities market in which a system for determining whether an order complies with a rule-set is used according to the principles of the present invention.

As shown in FIG. 23, an exchange of equities market 140 may also use system 2340 for determining whether an order placed by investor 110 complies with a rule-set, as described above in connection with systems 1850 and 1950 of FIGS. 18-19, respectively. For example, if an order received by the exchange complies with the rule-set, as determined by system 2340, then the order may be executed by, e.g., a specialist or other market-maker on the exchange. Otherwise, as described above, the order may be canceled or rejected (e.g., by OFP 110 or consolidating broker-dealer 130), or the investor 110 may be given an opportunity to either modify the order such that it complies with the rule-set, to accept a modified order that complies with the rule-set, or to accept the order with an increased fee (commission). Alternatively, for example (and as described above), an order not complying with the rule-set may be automatically modified (e.g., by reducing the order size) so that it complies with the rule-set, and then executed by, e.g., a specialist on the exchange. As with systems 1850 and 1950 described above, system 2340 shown in FIG. 23 may be, for example, a computer implemented system that analyzes various characteristics of orders originating from investor 110 to determine whether the order complies with the rule-set. Moreover, system 2340 may be, for example, either a part of, or associated with, the exchange of equities market 140 that is using it. The invention is not limited in this manner.

The provision of the methods and systems to detect, track and respond to toxic order levels in an equities order flow described above has various benefits to many different constituencies in the equities trading world. For example, by providing systems to facilitate the detection of toxic (or likely toxic) orders, broker-dealers and OFPs benefit from their ability to provide execution quality enhancements, with minimal risk of exploitation by professional traders. Moreover, they have a tool set which enables them to, for example, give incentives to their trading counterparties to provide an order flow with a reduced level of toxicity. By extension, investors benefit as a result of the higher quality and/or more efficient trade execution which they receive from OFPs and broker-dealers. In addition, those investors with low toxicity order flows will also benefit from being subject to lower transaction costs. Broker-dealers that are able to safely serve as counterparty to order flows, such as anonymous equities order flows via the use of toxicity detection, tracking and response systems would be able to significantly differentiate themselves from other broker-dealers that do not have access to such systems. This added differentiation could be used to induce partnering with order flow providers and/or to attract additional order flow from outside a broker-dealer's current network of OFPs.

Moreover, the toxicity analyzers, profitability analyzers, and systems for determining compliance with a rule-set described herein are advantageous under current SEC and equities exchange rules, but may also be used in the event selected SEC or exchange rules are altered in the future. For example, in alternative embodiments, the invention could provide toxicity and profitability analyzers, and systems for determining compliance with a rule-set, through new market structures and trading technologies (e.g., new order crossing mechanisms) as they are developed and approved by the regulators.

Although the invention has been described and illustrated in the foregoing illustrative embodiments, it is understood that the present disclosure has been made only by way of example, and that numerous changes in the details of implementation of the invention can be made without departing from the spirit and scope of the invention. For example, it will be understood that in various embodiments, the present invention will examine selected parameters of incoming orders, and will execute some or all of the orders only to the extent that their individual (or combined) parameters are deemed acceptable.

Moreover, according to various embodiments of the present invention, the toxicity analyzers, profit analyzers and/or systems for determining compliance with a rule-set will be capable of communicating using the protocol or protocols by which orders in the equities order flow are transmitted. For example, these components and systems may be constructed such that details of orders (e.g., order parameters) being transmitted between various parties in the equities order flow chain may be directly ascertainable. Accordingly, the toxicity analyzers, profit analyzers and/or systems for determining compliance with a rule-set described above may be capable of communicating with some or all of the commonly used protocols that include, for example, Financial Information Exchange (FIX), Common Message Switch (CMS), as well as other standard or proprietary protocols. According to various other embodiments of the invention, for example, additional components and/or systems (that are compatible with the protocol or protocols by which orders are being transmitted) may be used for communicating various order details to the toxicity analyzers, profit analyzers and/or systems for determining compliance with a rule-set when they are not capable of directly ascertaining order details. The invention is not limited in this manner.

The detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description provided above.

The system according to the invention may include a general purpose computer, or a specially programmed special purpose computer. The user may interact with the system via, e.g., a personal computer or PDA, over, e.g., the Internet, an Intranet, etc. The system may be implemented as a distributed computer system rather than a single computer. Similarly, the communications link may be a dedicated link, a modem over a POTS line, the Internet and/or any other method of communicating between computers and/or users. Moreover, the processing could be controlled by a software program on one or more computer systems or processors, or could even be partially or wholly implemented in hardware.

Although a single computer may be used, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an object oriented and/or interpretive environment such as Java and transported to multiple destinations to various users.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. It should also be noted that, while some embodiments described above may currently not be approved under federal or other relevant regulations, these embodiments are nevertheless considered to be part of the present invention.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The many features and advantages of the embodiments of the present invention are apparent from the detail specification, and thus, it is intended to cover all such features and advantages of the invention that fall within the true spirit and scope of the invention. All suitable modifications and equivalents maybe resorted to, falling within the scope of the invention.

What is claimed is:

1. A method of executing an equity order by a computer trading system comprising at least one of the sequential, sequence independent and non-sequential steps of:
   electronically receiving the order by a toxicity analyzer computer system including order characteristics;
   determining at least one toxicity quotient responsive to the order characteristics, the toxicity quotient defining when the order, if executed, comprises one of no profit, reduced profit and a loss when at least one of a wholesaler and a market maker provides market liquidity;
   analyzing the order to determine eligibility for execution using the at least one toxicity quotient; and
   determining whether the order is eligible for execution; and
   electronically transmitting the order by the toxicity analyzer computer system to the computer trading system for execution responsive to the eligibility for execution as determined by analyzing the order using the at least one toxicity quotient.

2. The method of claim 1, further comprising the step of measuring at least one of order, market condition, and execution parameters of at least one order to be executed, and correlating the measured parameters with the outcome of trade to determine the at least one toxicity quotient.

3. The method of claim 1, wherein the step of analyzing further comprises the step of reviewing one or more parameters of the order relating to at least one of size of the order, frequency of order submission, identity of the equity, market source of national-best-bid-or-offer (NBBO), order size relative to NBBO size, liquidity of the equity, current NBBO bid-offer spread, and the equity-market performance correlation of the equity.

4. The method of claim 1, wherein the step of determining at least one toxicity quotient responsive to the order characteristics comprises the step of generating the at least one toxicity quotient by the toxicity analyzer computer system.

5. The method of claim 1, further comprising the step of monitoring the outcome of the trade after it has been executed.

6. The method of claim 5, further comprising the step of implementing corrective action based at least in part on the step of monitoring the outcome of the trade.

* * * * *